US012756790B2

(12) United States Patent
Shinnae

(10) Patent No.: US 12,756,790 B2
(45) Date of Patent: Oct. 6, 2026

(54) INFORMATION PROCESSING APPARATUS, METHOD FOR THE SAME, AND STORAGE MEDIUM

(71) Applicant: CANON KABUSHIKI KAISHA, Tokyo (JP)

(72) Inventor: Toru Shinnae, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 237 days.

(21) Appl. No.: 18/792,091

(22) Filed: Aug. 1, 2024

(65) Prior Publication Data

US 2025/0055953 A1 Feb. 13, 2025

(30) Foreign Application Priority Data

Aug. 8, 2023 (JP) ................................ 2023-129010

(51) Int. Cl.

*H04N 1/60* (2006.01)
*H04N 1/00* (2006.01)
*H04N 1/193* (2006.01)

(52) U.S. Cl.

CPC ......... *H04N 1/6008* (2013.01); *H04N 1/6038* (2013.01); *H04N 1/00795* (2013.01); *H04N 1/193* (2013.01)

(58) Field of Classification Search

None
See application file for complete search history.

(56) References Cited

U.S. PATENT DOCUMENTS 8,590,775 B2 * 11/2013 Hamada ............ H04N 1/32251 235/494
2003/0030825 A1 * 2/2003 Kubo .................. H04N 1/6011 358/1.9
2008/0137116 A1 * 6/2008 Lee ....................... G06F 3/1208 358/1.9
2015/0207958 A1 * 7/2015 Tasaki .................... H04N 1/603 358/1.9
2015/0350484 A1 * 12/2015 Suzuki ................ H04N 1/2338 358/474

FOREIGN PATENT DOCUMENTS

JP 2017157971 A 9/2017

* cited by examiner

*Primary Examiner* — Haris Sabah
(74) *Attorney, Agent, or Firm* — Canon U.S.A., Inc. IP Division

(57) ABSTRACT

Paper white in a color chart and sheet white point information regarding all printer profiles that are stored are compared with each other. Printer profiles with which the color difference from the paper white in the color chart is small are displayed as candidates to be used to create a color chart profile.

14 Claims, 18 Drawing Sheets

FIG.4A
0401, 0402, 0403, 0404
| DATA ID | PRINT DATA NAME | DATA |
|---|---|---|
| 0001 | COLOR CHART A | 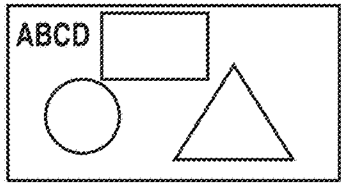  |
| 0002 | COLOR CHART B | 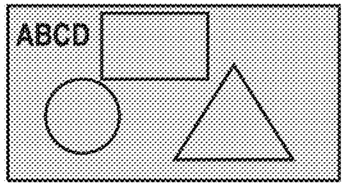  |
FIG.4B
0405, 0406, 0407, 0408, 0409
| PROFILE ID | TYPE | PROFILE NAME | SHEET WHITE POINT |
|---|---|---|---|
| 0001 | OUTPUT | Profile_Plain | L:95, a:1, b:2 |
| 0002 | OUTPUT | Profile_Coated | L:90, a:3, b:1 |
| 0003 | SCANNER | Scanner_Profile | L:96, a:2, b:-1 |
| 0004 | INPUT | Original_Profile | L:93, a:-5, b:-3 |
| 0005 | OUTPUT | Custom_Profile | x:0.8, y:0.8, z:0.7 |
FIG.4C
0410
| PAPER WHITE COLOR DIFFERENCE TOLERANCE VALUE |
|---|
| 1.0 |

FIG.7A 0406 0407 0408 0409 0701 0702

0405

| PROFILE ID | TYPE | PROFILE NAME | SHEET WHITE POINT | PROFILE CREATION DATE AND TIME | LAST USE DATE AND TIME |
|---|---|---|---|---|---|
| 0001 | OUTPUT | Profile_Plain | L:95, a:1, b:2 | 2023/2/1 | 2023/2/1 |
| 0002 | OUTPUT | Profile_Coated | L:90, a:3, b:1 | 2023/2/5 | 2023/2/6 |
| 0003 | SCANNER | Scanner_Profile | L:96, a:2, b:-1 | 2023/1/1 | — |
| 0004 | INPUT | Original_Profile | L:93, a:-5, b:-3 | 2023/1/1 | — |
| 0005 | OUTPUT | Custom_Profile | x:0.8, y:0.8, z:0.7 | 2023/1/31 | — |

FIG.7B

0703

| PROFILE VALIDITY PERIOD |
|---|
| 7 DAYS |

FIG.12

1202, 1203, 1204, 1205

| PROFILE ID | TYPE | PROFILE NAME | SHEET WHITE POINT |
|---|---|---|---|
| 0001 | OUTPUT | Profile_Plain | L:95, a:1, b:2 |
| 0002 | OUTPUT | Profile_Coated | L:90, a:3, b:1 |
| 0003 | SCANNER | Scanner_Profile | L:96, a:2, b:-1 |
| 0004 | INPUT | Original_Profile | L:93, a:-5, b:-3 |
| 0005 | OUTPUT | Custom_Profile | x:0.8, y:0.8, z:0.7 |
| 0006 | COLOR MATCHING | ColotMatch_Profile | L:93, a:-4, b:2 |

1201

INFORMATION PROCESSING APPARATUS, METHOD FOR THE SAME, AND STORAGE MEDIUM

BACKGROUND

Field

The present disclosure relates to a color management system that reproduces a color in a color chart.

Description of the Related Art

Reproduction of a color of a product printed in the past or a color chart can be achieved by a method for color matching in which the color quality of an image forming apparatus is adjusted and a color in data for print data itself is changed. There is also a method for scanning a color chart using a color measurement apparatus or a scanner that measures a color in a print product and scans the print product, and based on scanned data on the color chart and an output profile describing the characteristics of the print product, creating an input profile for color matching that defines a color that should be produced. A user can reproduce a color of the color chart by printing using the created input profile for color matching.

The color matching is generally often performed based on a user's subjective evaluation. In this case, under the influence of a white portion of the background of a printed image, the entire appearance of the image varies due to the characteristics of the human eye. Particularly, a highlighted portion having a light color in the printed image is influenced by paper white where nothing is printed. Japanese Patent Application Laid-Open No. 2017-157971 discusses a method for analyzing paper white in which a paper white portion is detected from scanned data, and the characteristics of the paper white portion is calculated.

If, as in a conventional technique, only paper white in a color chart is factored in in creation of an input profile for color matching, the color matching accuracy of a highlighted portion decreases in a case where characteristics of paper white in a sheet on which printing is to be actually performed differs from characteristics of paper white in the color chart.

SUMMARY

The present disclosure is directed to providing a method for performing color matching with high accuracy even in a case where the characteristics of paper white differ.

According to some embodiments, a method for an information processing apparatus that communicates with an image forming apparatus, the method includes acquiring, as first acquiring, image data generated by the image forming apparatus scanning a document, identifying a paper white portion from the image data acquired by the first acquiring, acquiring, as second acquiring, one or more output profiles, displaying, as first displaying, the one or more output profiles acquired by the second acquiring, based on information regarding the paper white portion identified by the identifying, and creating, as first creating, an input profile based on an output profile selected from among the one or more output profiles displayed by the first displaying and the image data acquired by the first acquiring.

Further features of the present disclosure will become apparent from the following description of exemplary embodiments with reference to the attached drawings.

BRIEF DESCRIPTION OF THE DRAWINGS

FIGS. 4A to 4C illustrate examples of data that are stored in the client computer and the image forming apparatus and are used to create an input profile for color matching according to the first exemplary embodiment.

FIGS. 7A and 7B illustrate examples of data that are stored in a client computer and an image forming apparatus and are used to create an input profile for color matching according to a second exemplary embodiment.

FIG. 12 is a diagram illustrating an example of data that is stored in a client computer and an image forming apparatus according to a fifth exemplary embodiment.

DESCRIPTION OF THE EMBODIMENTS

Hereinafter, various exemplary embodiments, features, and aspects for implementing the present disclosure will be described with reference to the drawings.

The following exemplary embodiments do not limit the present disclosure according to the scope of claims, and all combinations of features described in the exemplary embodiments are not necessarily essential to the solving means of the present disclosure.

Figure 1:
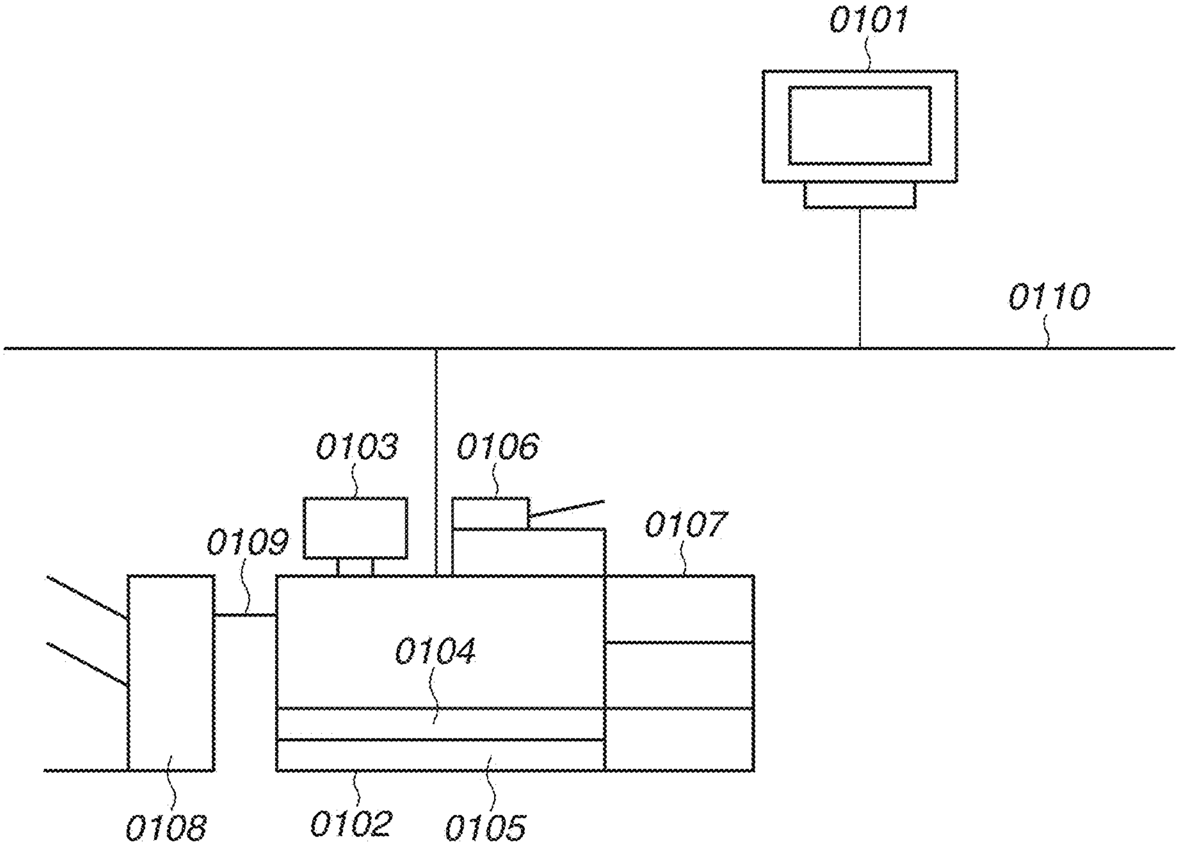
FIG. 1 is a schematic diagram illustrating configurations of a client computer and an image forming apparatus according to a first exemplary embodiment.

FIG. 1 is a schematic diagram illustrating the configurations of a client computer and an image forming apparatus according to a first exemplary embodiment.

A client computer 0101 is connected to an image forming apparatus 0102 on the same network via a network 0110.

When the client computer 0101 creates an input profile for color matching, the client computer 0101 acquires profile information from the image forming apparatus 0102, requests the image forming apparatus 0102 to execute scanning, and requests the image forming apparatus 0102 to acquire scanned data via the network 0110, based on set information.

These processes are executed by control units described below with reference to FIG. 3.

The image forming apparatus 0102 includes a user interface (UI) panel 0103, a sheet feeding deck 0104, a sheet feeding deck 0105, and a scanner 0106. To the image forming apparatus 0102, an optional deck 0107 including three sheet feeding stages is further connected. The image forming apparatus 0102 is an electrophotographic image forming apparatus, for example. The UI panel 0103 is a user interface including a touch panel of a capacitive type, for example. The scanner 0106 includes a document platen on which a print product is to be placed. The scanner 0106 can scan a print product placed on the document platen by using a sensor and manage the scanned print product as data.

The image forming apparatus 0102 further includes a sheet discharge apparatus 0108. The sheet discharge apparatus 0108 is connected to the image forming apparatus 0102 via a cable 0109. The sheet discharge apparatus 0108 includes some sheet discharge trays and can stack a resulting product printed by the image forming apparatus 0102 on the sheet discharge trays.

A print job is generated by the client computer 0101 and transmitted to the image forming apparatus 0102 via the network 0110, and the image forming apparatus 0102 performs printing process on a sheet. A configuration in which not only a single image forming apparatus 0102 but also a plurality of image forming apparatuses 0102 is present on the network 0110 may also be employed.

The connection form between the client computer 0101 and the image forming apparatus 0102 illustrated in the present exemplary embodiment is merely an example, and a variety of other connection forms can be employed in addition to that illustrated in the present exemplary embodiment.

Figure 2:
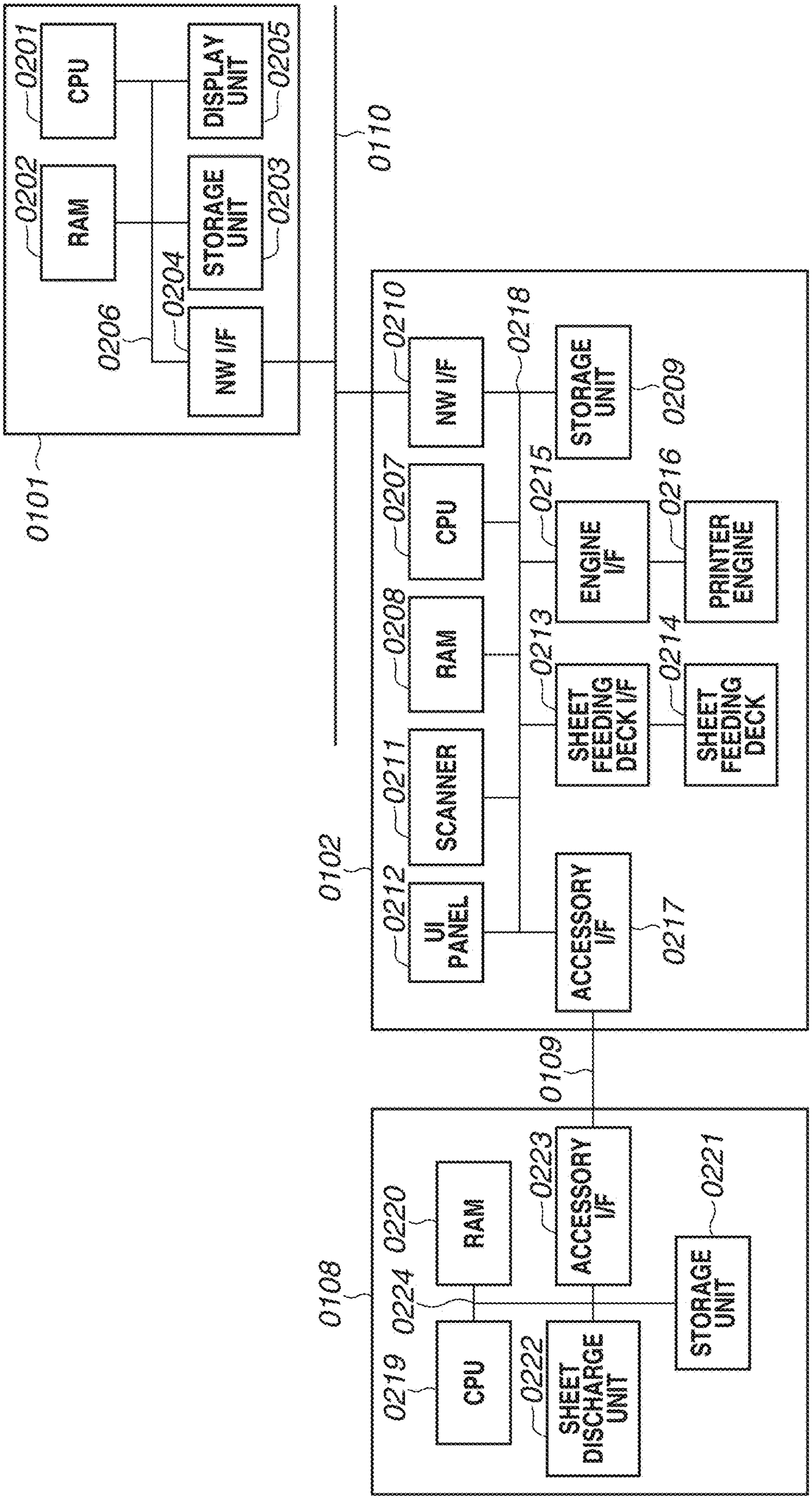
FIG. 2 is a block diagram illustrating the client computer and the image forming apparatus according to the first exemplary embodiment.

FIG. 2 is a block diagram illustrating the control configurations of the client computer 0101 and the image forming apparatus 0102 according to the present exemplary embodiment.

A central processing unit (CPU) 0201 performs control of components in the client computer 0101 via a system bus 0206 and controls calculations for the components. The CPU 0201 controls execution of a program stored in a storage unit 0203 and loaded into a random-access memory (RAM) 0202. The RAM 0202 is a type of general volatile storage device directly accessible by the CPU 0201 and is used as a work area for the CPU 0201 or another temporary data storage area. The storage unit 0203 functions as a temporary storage area and a work memory when the client computer 0101 operates. A network interface (hereinafter, "NW I/F") 0204 is connected to an NW I/F 0210 of the image forming apparatus 0102 on the network 0110 via the network 0110 and controls communication between the client computer 0101 and the image forming apparatus 0102. A display unit 0205 is a hardware component and is a user interface that visually displays information in the client computer 0101. For example, the display unit 0205 is a monitor display.

A CPU 0207 performs control of components in the image forming apparatus 0102 via a system bus 0218 and controls calculations for the components. The CPU 0207 controls execution of a program stored in a storage unit 0209 and loaded into a RAM 0208. The RAM 0208 is a type of general volatile storage device directly accessible by the CPU 0207 and is used as a work area for the CPU 0207 or another temporary data storage area. The storage unit 0209 functions as a temporary storage area and a work memory when the image forming apparatus 0102 operates.

The NW I/F 0210 is connected to the NW I/F 0204 of the client computer 0101 via the network 0110 and controls communication between the client computer 0101 and the image forming apparatus 0102.

A scanner 0211 is a hardware component of the scanner 0106. The scanner 0211 scans a print product by using the sensor and enables the scanned print product to be handled as scanned data. Some scanner includes a mechanism termed an automatic document feeder (ADF) to automatically scan a print product or includes only a document platen for reading of a print product. A UI panel 0212 is a hardware component of the UI panel 0103 and is a user interface for performing the overall operation of the image forming apparatus 0102. In the present exemplary embodiment, the UI panel 0212 includes a touch panel of a capacitive type.

A sheet feeding deck I/F 0213 controls communication with a sheet feeding deck 0214 and controls the sheet feeding deck 0214. The sheet feeding deck 0214 is a collective term of the sheet feeding decks 0104 and 0105 and the optional deck 0107 as a hardware component. An engine I/F 0215 controls communication with a printer engine 0216 and controls the printer engine 0216.

An accessory I/F 0217 connects to an accessory I/F 0223 via the cable 0109. That is, the image forming apparatus 0102 communicates with the sheet discharge apparatus 0108 via the accessory I/Fs 0217 and 0223.

A CPU 0219 performs control of components in the sheet discharge apparatus 0108 via a system bus 0224, and controls calculations for the components and execution of a program stored in a storage unit 0221 and loaded into a RAM 0220. The RAM 0220 is a type of general volatile storage device directly accessible by the CPU 0219 and is used as a work area for the CPU 0219 or another temporary data storage area. The storage unit 0221 functions as a temporary storage area and a work memory when the sheet discharge apparatus 0108 operates. A sheet discharge unit 0222 controls an operation of discharging a sheet to any of the sheet discharge trays included in the sheet discharge apparatus 0108 and monitoring and controlling of the stacking state of each tray.

The accessory I/F 0223 connects to the accessory I/F 0217 via the cable 0109. That is, the sheet discharge apparatus 0108 communicates with the image forming apparatus 0102 via the accessory I/Fs 0223 and 0217.

Figure 3:
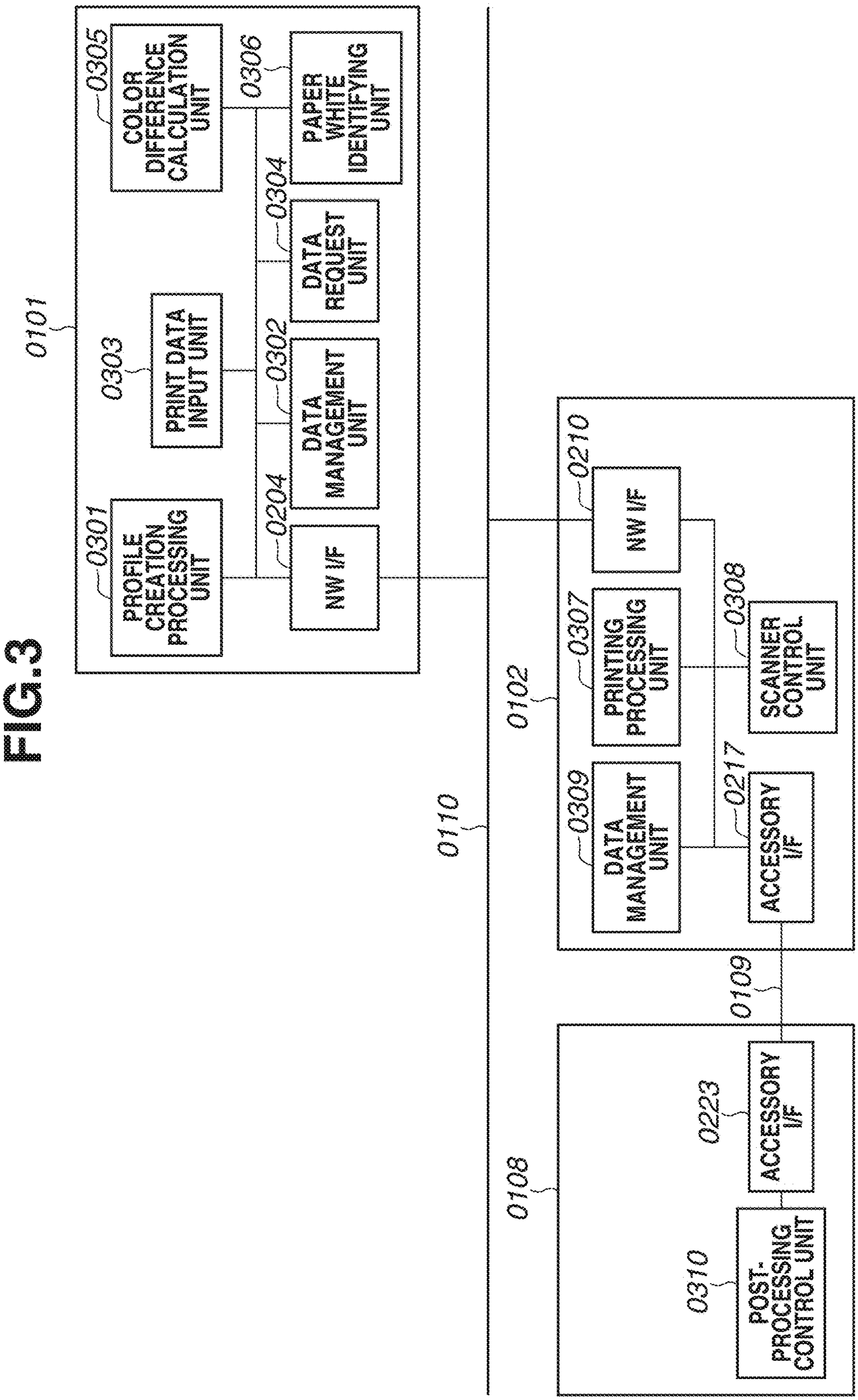
FIG. 3 is a software block diagram illustrating connection systems of control units of the client computer and the image forming apparatus according to the first exemplary embodiment.

FIG. 3 is a software block diagram illustrating connection systems of control units of the client computer 0101, the image forming apparatus 0102, and the sheet discharge apparatus 0108.

The client computer 0101 includes a profile creation processing unit 0301, a data management unit 0302, a print data input unit 0303, a data request unit 0304, a color difference calculation unit 0305, and a paper white identifying unit 0306. These control units are present in the RAM 0202 or the storage unit 0203 of the client computer 0101 and executed by the CPU 0201 of the client computer 0101.

The profile creation processing unit 0301 is called by the CPU 0201 of the client computer 0101 and creates an input profile for color matching and an output profile describing the characteristics of a print product. The data management unit 0302 is called by the CPU 0201 of the client computer 0101 and manages a profile, print data, and settings for creating a profile in the client computer 0101. The print data input unit 0303 is called by the CPU 0201 of the client computer 0101 and inputs print data to the image forming apparatus 0102. The data request unit 0304 is called by the CPU 0201 of the client computer 0101 and acquires a profile (described below with reference to FIGS. 4A to 4C) stored in the image forming apparatus 0102 and data scanned using the scanner 0211. The color difference calculation unit 0305 is called by the CPU 0201 of the client computer 0101 and obtains the color difference between paper white in a color chart and a sheet white point of a profile. The paper white identifying unit 0306 is called by the CPU 0201 of the client computer 0101 and identifies a paper white portion from scanned data, based on information regarding print data.

The image forming apparatus 0102 includes a printing processing unit 0307, a scanner control unit 0308, and a data management unit 0309. These units are present in the RAM 0208 or the storage unit 0209 of the image forming apparatus 0102 and executed by the CPU 0207 of the image forming apparatus 0102.

The printing processing unit 0307 is called by the CPU 0207 of the image forming apparatus 0102 and performs a printing process. The scanner control unit 0308 is called by the CPU 0207 of the image forming apparatus 0102 and scans a print product using the scanner 0211. The data management unit 0309 is called by the CPU 0207 of the image forming apparatus 0102 and manages information regarding the configuration and the ability of the image forming apparatus 0102, a print job, scanned data, and data on a profile.

The sheet discharge apparatus 0108 includes a post-processing control unit 0310. The post-processing control unit 0310 is present in the RAM 0220 or the storage unit 0221 of the sheet discharge apparatus 0108 and executed by the CPU 0219 of the sheet discharge apparatus 0108. The post-processing control unit 0310 is called by the CPU 0219 of the sheet discharge apparatus 0108 and discharges a sheet subjected to printing to any of the trays.

FIGS. 4A to 4C illustrate examples of print data, a profile, and setting values stored in the client computer 0101 and the image forming apparatus 0102 and to be used to create an input profile for color matching. These pieces of information are stored in the storage unit 0203 of the client computer 0101 and the storage unit 0209 of the image forming apparatus 0102.

FIG. 4A illustrates an example of print data, based on which printing is performed. The print data is stored in the storage unit 0203 of the client computer 0101. An information table 0401 indicates a type of information stored as the print data. Data ID 0402 is identifier (ID) information for identification of the stored print data. While a four-digit number is illustrated in this example, this is merely an example. Alternatively, a variety of methods such as the combination of random characters may be used.

Print data name 0403 indicates the name of the print data. Data 0404 indicates what data the saved print data is. For example, image data is stored.

FIG. 4B illustrates an example of a profile stored in the storage unit 0209 of the image forming apparatus 0102.

As a profile, for example, there is an International Color Consortium (ICC) profile for color adjustment. As the ICC profile, there are a source profile and a printer profile. The source profile is used to convert red, green, and blue (RGB) (or cyan, magenta, yellow, and black (CMYK)) data into a normalized L*a*b* (hereinafter, "Lab") space once and convert this Lab data into a CMYK space suitable for a printer as a target again. The source profile includes an RGB profile and a CMYK profile. In a case where acquired image data is an RGB image, the RGB profile is selected. In a case where acquired image data is a CMYK image, the CMYK profile is selected. The printer profile is created according to the color characteristics of the image forming apparatus 0102.

While the image forming apparatus 0102 that uses the ICC profile is described in the present exemplary embodiment, the present disclosure is not limited to this. In addition to the ICC profile, a color separation table in a color rendering dictionary (CRD) or Photoshop employed from PostScript Level 2 advocated by Adobe Inc. can be used.

The ICC profile contains a header, a tag, and data on the ICC profile. The tag also describes a (gamt) tag describing whether a color represented not only by the color conversion table but also by a white point (Wtpt) or a Lab value defined within the profile is inside or outside a reproduction range within which a hard copy of the color can be reproduced.

Image data input to the image forming apparatus 0102 does not necessarily employ the representation of colors in the Lab color space, and can be represented in a variety of data formats (color systems), such as the RGB, the CMYK, and the International Commission on Illumination (CIE) XYZ color spaces. Even between pieces of image data in a common data format, a perceived color in the original images that may be reproduced by the image forming apparatus 0102 can differ according to the characteristics of the input device (e.g., according to the setting of the gamma value or the color temperature of the monitor). Thus, the input image data is converted into Lab data represented by a device-independent color space once. Then, a command (a CMYK signal) to cause an image forming engine to form an image from L'a'b' data obtained by certain corrections to the Lab data is generated. In this process, a profile that is used for the conversion from the color system of the input device into the Lab color space is an input ICC profile. A profile that is used for the conversion from the Lab color space into a color space handled by the image forming engine (a space of values that can be represented by the CMYK signal) is an output ICC profile. Although the CIELAB color space is employed as the device-independent color space in the present exemplary embodiment, another color space (e.g., the CIE 1931 XYZ color space) may be employed instead.

An information table 0405 indicates a type of information stored as the profile. Profile ID 0406 is ID information for identification of the saved profile. While a four-digit number is illustrated in this example, this is merely an example. Alternatively, a variety of methods such as the combination of random characters may be used. Type 0407 indicates a type of the profile. In a case where the type is "input", the profile is a profile indicating values that are to be obtained by converting input signal values, such as cyan (C), magenta (M), yellow (Y), and black (K) values, into the Lab color space, which is the common color space. In a case where the type is "output", the profile is a profile indicating values that are to be obtained by converting the Lab color space into CMYK values. In a case where the type is "scanner", the profile is a profile for scanning indicating values that are to be obtained by converting signal values of an image acquired using the scanner 0211 into the Lab color space, which is the common color space.

Profile name 0408 indicates a name of the profile. Sheet white point 0409 indicates sheet white point information regarding the profile. The profile is defined in the ICC format. In the definition of the ICC format, a definition of paper white represented by a value in the Lab color space or the XYZ color space, which is termed as a sheet white point, is essential in the profile. The sheet white point 0409 indicates a content of the sheet white point.

Figure 5B:
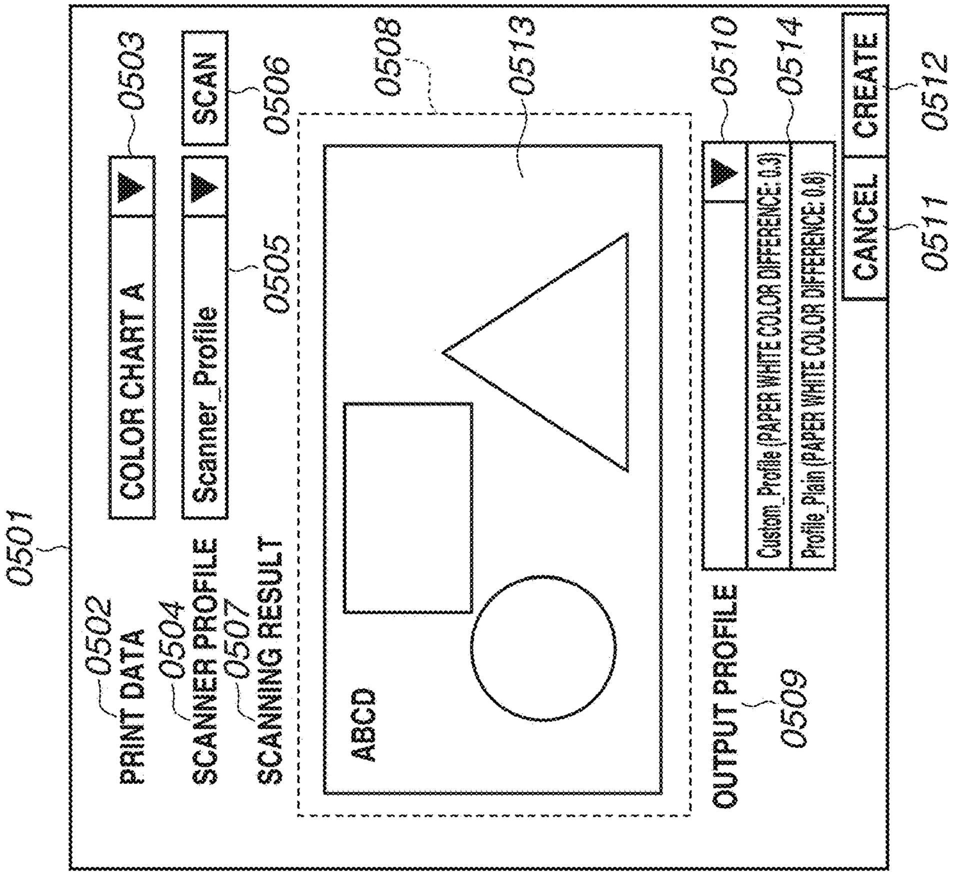
FIGS. 5A and 5B illustrate examples of an execution screen that is displayed when an input profile for color matching is created according to the first exemplary embodiment.
Figure 5A:
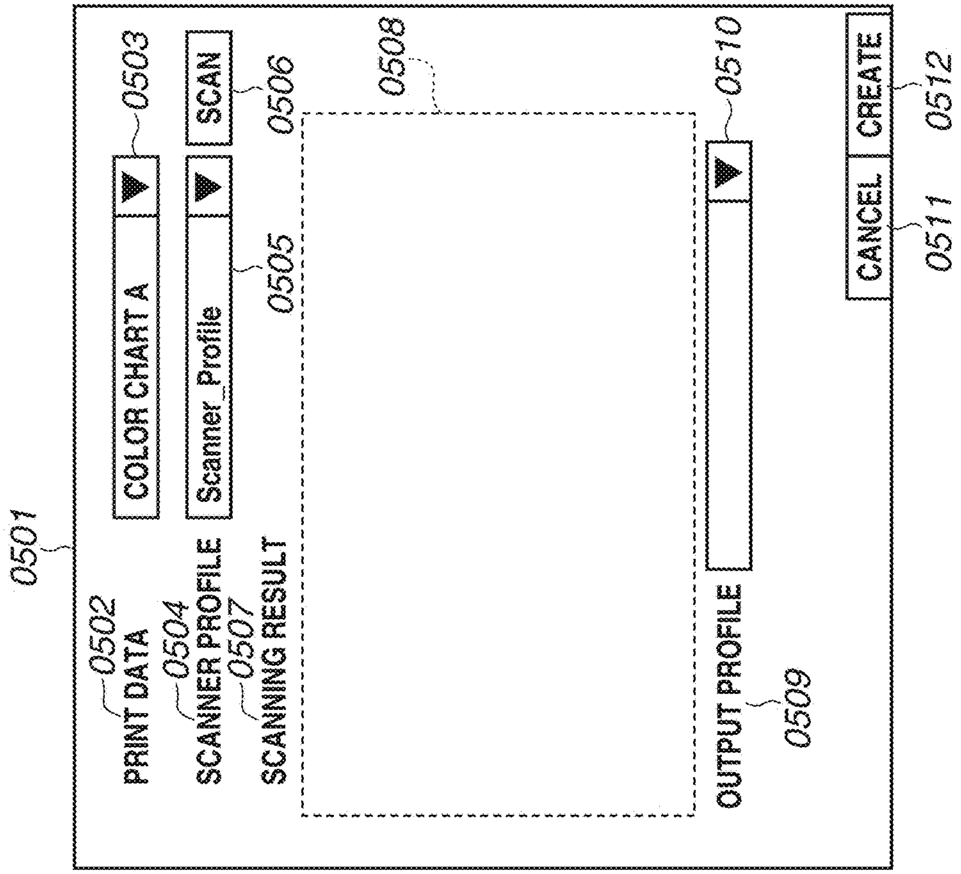

FIG. 4C illustrates a color difference tolerance value that is used to compare paper white when an input profile for color matching is created. This setting value is stored in the storage unit 0203 of the client computer 0101. An information table 0410 indicates a value stored as the paper white color difference tolerance value. In this example, 1.0 is set as the tolerance value. In a case where the color difference between paper white in a color chart and a sheet white point of a profile is less than or equal to 1.0, the profile is used as a profile of a selection candidate in creation of an input profile for color matching. With reference to FIGS. 5A, 5B, and 6, a description is given of a procedure of the creation process of an input profile for color matching according to the present exemplary embodiment.

FIGS. 5A and 5B illustrate execution screens displayed when an input profile for color matching is created according to the present exemplary embodiment. FIG. 5A illustrates the screen displayed before a color chart is scanned in creation of an input profile for color matching. This screen is displayed on the display unit 0205 of the client computer 0101 by the CPU 0201 of the client computer 0101. A screen 0501 indicates the entire appearance of the execution screen in creation of an input profile for color matching. An item 0502 is used to set print data. A button 0503 is used to select print data, and a list of print data as selection candidates is displayed in a drop-down list. The data name of print data selected from the list is displayed. An item 0504 is used to set a scanner profile. A button 0505 is used to select a scanner profile, and a list of scanner profiles as selection candidates is displayed in a drop-down list. The profiles displayed as the selection candidates are profiles each having "scanner" as its type among profiles stored in the storage unit 0209 of the image forming apparatus 0102. The item 0504 may be automatically set to a single profile according to the image forming apparatus that executes scanning. A scan button 0506 is used to execute scanning. In response to the scan button 0506 being pressed, the client computer 0101 instructs the image forming apparatus 0102 to execute scanning using the scanner 0211. An item 0507 indicates the scanning result. An area 0508 displays a scanned image as the scanning result. An item 0509 is used to set an output profile. A button 0510 is used to select an output profile, and a list of output profiles as selection candidates is displayed in a drop-down list. The profiles displayed as the selection candidates are profiles each having "output" as its type among the profiles stored in the storage unit 0209 of the image forming apparatus 0102. In response to a cancel button 0511 being pressed, the currently displayed screen is closed without creating an input profile for color matching. In response to a create button 0512 being pressed, an input profile for color matching is created.

FIG. 5B illustrates the screen displayed after a color chart is scanned when an input profile for color matching is created. This screen is displayed on the display unit 0205 of the client computer 0101 by the CPU 0201 of the client computer 0101. Data 0513 is scanned data obtained using, in response to the scan button 0506 being pressed, the scanner 0211 of the image forming apparatus 0102. The CPU 0201 of the client computer 0101 acquires the scanned data from the storage unit 0209 of the image forming apparatus 0102 and displays the acquired scanned data on the display unit 0205. A list 0514 is a list of selection candidates for an output profile.

Figure 6A:
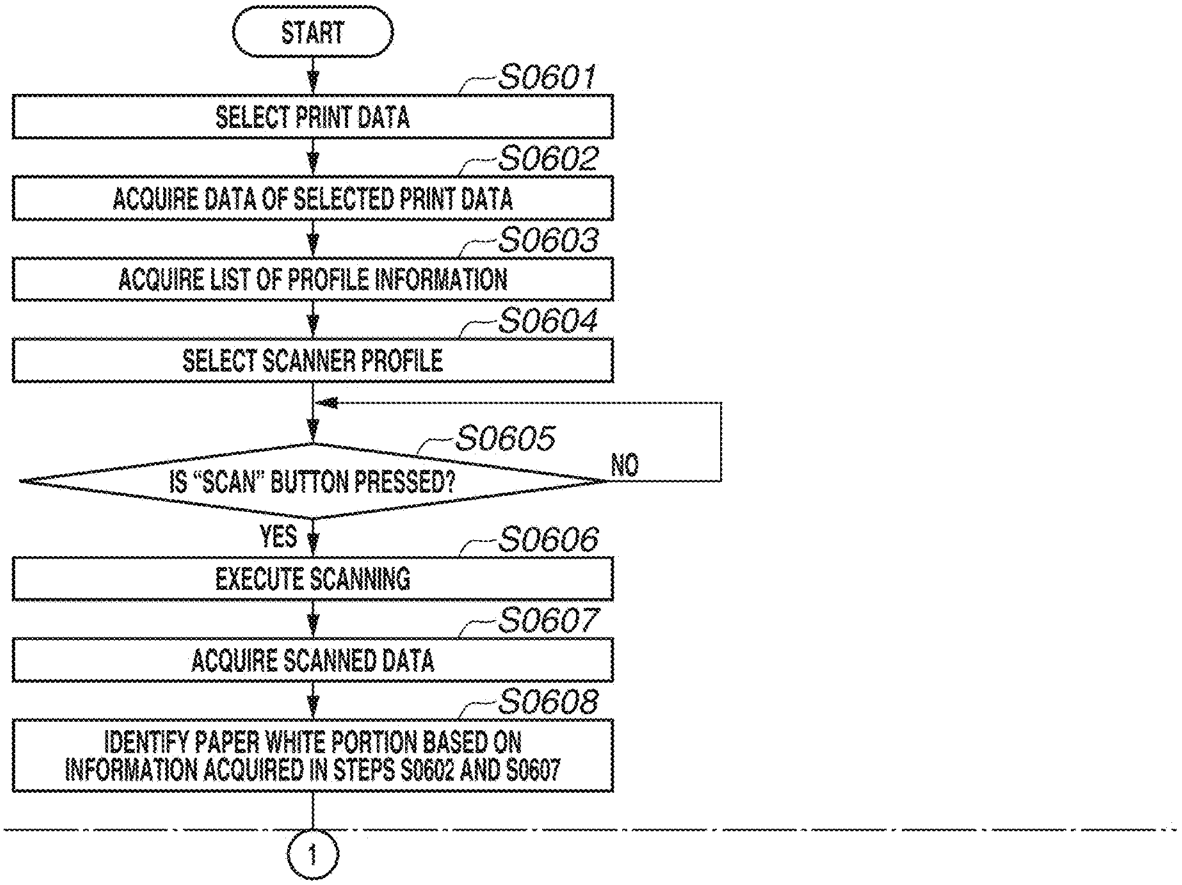
FIGS. 6A and 6B are flowcharts illustrating a procedure of a process of creating an input profile for color matching according to the first exemplary embodiment.
Figure 6B:
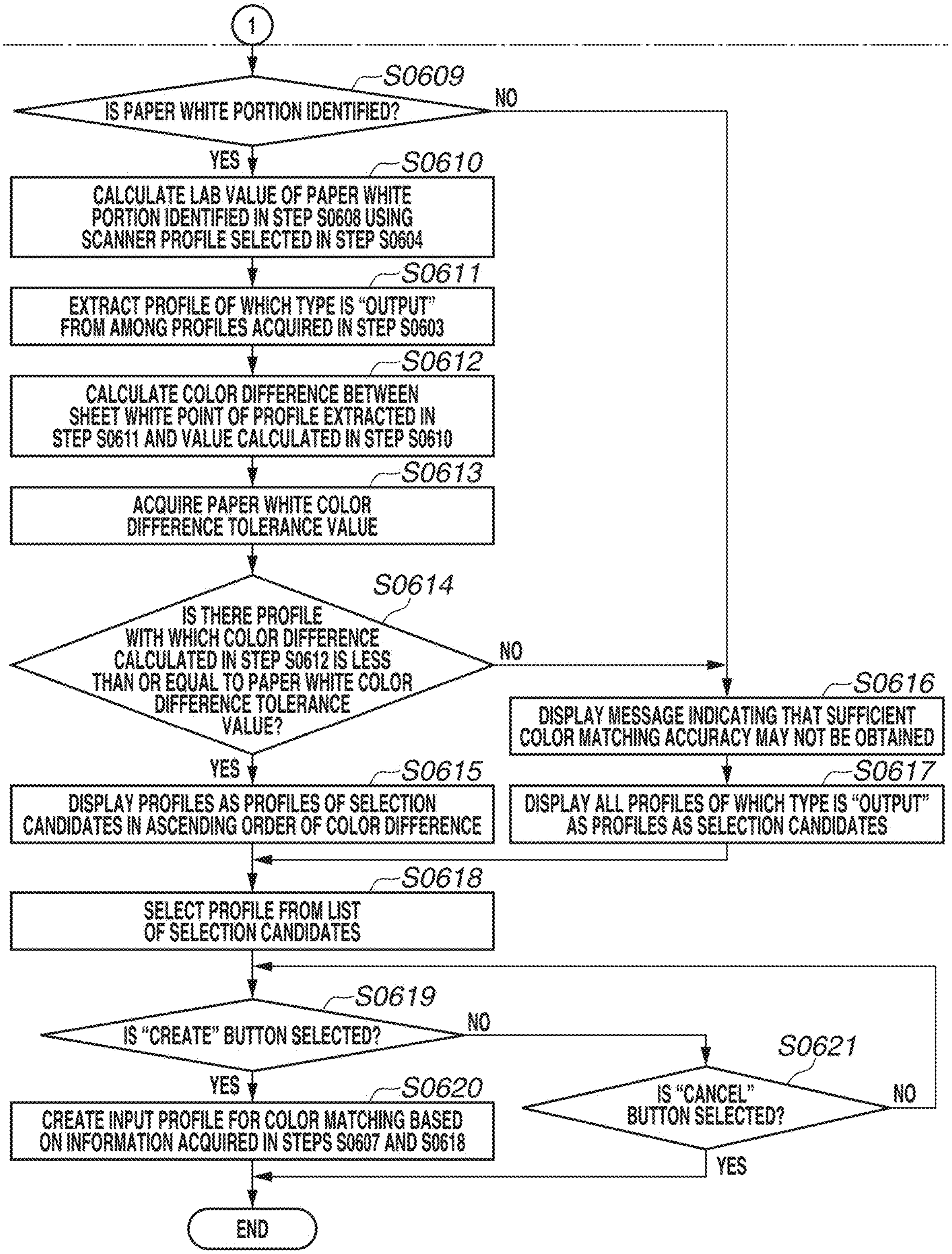

Paper white portions are identified from the scanned data, and paper white portions, each having a color difference between the value of the paper white and the sheet white point of the profile less than or equal to a tolerance value, are displayed as the selection candidates in ascending order of the color difference. FIGS. 6A and 6B are flowcharts illustrating a procedure of the creation process of an input profile for color matching. The following processing is executed by the CPU 0201 of the client computer 0101 and the CPU 0207 of the image forming apparatus 0102.

In step S0601, the CPU 0201 of the client computer 0101 stores print data selected by a user on the screen for creation of an input profile for color matching as illustrated in FIG. 5A in the RAM 0202. In step S0602, the CPU 0201 of the client computer 0101 acquires the data 0404 on the print data selected in step S0601 from the storage unit 0203. In step S0603, the CPU 0201 of the client computer 0101 acquires profile information regarding profiles present in the storage unit 0209 of the image forming apparatus 0102 via the network 0110. In step S0604, the user selects a profile having "scanner" as its type from among the profiles acquired in step S0603 on the screen for creation of an input profile for color matching as illustrated in FIG. 5B, and the CPU 0201 of the client computer 0101 stores the selected profile in the RAM 0202. In step S0605, the CPU 0201 of the client computer 0101 determines whether the scan button 0506 is pressed. In a case where the CPU 0201 determines in step S0605 that the scan button 0506 is pressed (YES in step S0605), the processing proceeds to step S0606. In a case where the CPU 0201 determines in step S0605 that the scan button 0506 is pressed (NO in step S0605), the processing returns to step S0605. In step S0605, the CPU 0201 of the client computer 0101 waits to perform the processing until the CPU 0201 determines that the scan button 0506 is pressed.

In step S0606, the CPU 0201 of the client computer 0101 instructs the image forming apparatus 0102 to execute scanning via the network 0110.

In response to receipt of the instruction to execute scanning from the client computer 0101 via the network 0110, the CPU 0207 of the image forming apparatus 0102 uses the scanner 0211 to scan a print product and stores scanned data on the print product in the storage unit 0209. In step S0607, the CPU 0201 of the client computer 0101 instructs the image forming apparatus 0102 to acquire the scanned data via the network 0110. In response to receipt of the instruction to acquire the scanned data from the client computer 0101 via the network 0110, the CPU 0207 of the image forming apparatus 0102 transmits the scanned data stored in the storage unit 0209 to the client computer 0101. The CPU 0201 of the client computer 0101 temporarily stores the acquired scanned data in the RAM 0202.

In step S0608, based on the data 0404 on the print data acquired in step S0602 and the scanned data acquired in step S0607, the CPU 0201 of the client computer 0101 identifies a portion corresponding to paper white in the scanned data. Alignment between the data pieces is performed to identify in which portion in the scanned data the data 0404 on the print data is present. For example, the print data is deformed using affine transformation, and identification of a portion in the scanned data corresponding to the deformed print data is performed. This method is merely an example, and the present disclosure is not limited to this method. After the identification of the position of the print data in the scanned data, checking of which pixel is present at which position is performed. In this process, paper white (data in which all the CMYK values are 0% or data in which all the RGB values are 255 (white)) in the print data is identified. Alternatively, after the identification of the position of the print data in the scanned data, a margin portion of the document other than the print data is identified, and the margin portion is identified as a portion corresponding to paper white in the scanned data.

In step S0609, the CPU 0201 of the client computer 0101 determines whether paper white is identified in step S0608. In a case where the CPU 0201 determines in step S0609 that paper white is identified, i.e., in a case where paper white (data in which all the CMYK values are 0% or data in which all the RGB values are 255 (white)) in the print data or a margin portion of the document is identified (YES in step S0609), the processing proceeds to step S0610. In a case where the CPU 0201 determines in step S0609 that paper white is not identified, i.e., in a case where paper white (data in which all the CMYK values are 0% or data in which all the RGB values are 255 (white)) in the print data or a margin portion of the document is not identified (NO in step S0609), the processing proceeds to step S0616.

In step S0610, using the scanner profile selected in step S0604, the CPU 0201 of the client computer 0101 obtains the Lab value, which is the value in the common color space, of the paper white portion in the scanned data identified in step S0608. In step S0611, the CPU 0201 of the client computer 0101 extracts profiles having "output" in the type 0407 from the list of the profile information acquired in step S0603. In step S0612, the CPU 0201 of the client computer 0101 obtains the color difference between the value of the sheet white point 0409 of each of the profiles having "output" in the type 0407 extracted in step S0611 and the Lab value of the paper white in the scanned data calculated in step S0610. In some cases, the sheet white point 0409 may be defined in the XYZ color space, but not the Lab color space. In a case where the sheet white point 0409 is defined in the XYZ color space, conversion of the XYZ color space into the Lab color space is performed, and then, the color difference is calculated. The calculation of the color difference and the conversion from the XYZ color space into the Lab color space are performed using generally used calculation methods. Then, in step S0613, the CPU 0201 of the client computer 0101 acquires the paper white color difference tolerance value in the information table 0410 stored in the storage unit 0203. Then, in step S0614, the CPU 0201 of the client computer 0101 determines whether there is a profile with which the color difference between the paper white in the scanned data calculated in step S0612 and the sheet white point 0409 of the profile is less than or equal to the paper white color difference tolerance value acquired in step S0613. In a case where the CPU 0201 determines in step S0614 that there is a profile with which the color difference is less than or equal to the paper white color difference tolerance value (YES in step S0614), the processing proceeds to step S0615. In a case where the CPU 0201 determines in step S0614 that there is no profile with which the color difference is less than or equal to the paper white color difference tolerance value (NO in step S0614), the processing proceeds to step S0616.

In step S0615, the CPU 0201 of the client computer 0101 displays the profiles determined in step S0614 to be the profiles having the color difference less than or equal to the paper white color difference tolerance value on the display unit 0205 as profiles of selection candidates in ascending order of the color difference. The profiles as the selection candidates are displayed as illustrated in the list 0514 in FIG. 5B.

In step S0616, the CPU 0201 of the client computer 0101 displays on the display unit 0205 a message indicating that there is a possibility that sufficient color matching accuracy is not obtained even if an input profile for color matching is created. In step S0617, the CPU 0201 of the client computer 0101 displays all the profiles having "output" in the type 0407 among the profiles acquired in step S0603 as profiles of selection candidates on the display unit 0205.

In step S0618, the CPU 0201 of the client computer 0101 stores in the RAM 0202 a profile selected by the user on the screen for creation of an input profile for color matching as illustrated in FIG. 5B.

In step S0619, the CPU 0201 of the client computer 0101 determines whether the create button 0512 is selected on the screen for creation of an input profile for color matching as illustrated in FIG. 5B. In a case where the CPU 0201 determines in step S0619 that the create button 0512 is selected (YES in step S0619), the processing proceeds to step S0620. In a case where the CPU 0201 determines in step S0619 that the create button 0512 is not selected (NO in step S0619), the processing proceeds to step S0621. In step S0620, the CPU 0201 of the client computer 0101 uses the information regarding the scanned data acquired in step S0607 and the profile selected in step S0618 to create an input profile for color matching to be matched to the color chart and stores the created input profile for color matching in the storage unit 0203. The CPU 0201 of the client computer 0101 transmits the created input profile for color matching to the image forming apparatus 0102 via the network 0110. In response to receipt of the created input profile for color matching from the client computer 0101 via the network 0110, the CPU 0207 of the image forming apparatus 0102 stores the created input profile in the storage unit 0209. In response to the client computer 0101 issuing a print instruction to the image forming apparatus 0102 using the created input profile, the image forming apparatus 0102 outputs a print product in which a tint of the color chart is reproduced with high accuracy.

In step S0621, the CPU 0201 of the client computer 0101 determines whether the cancel button 0511 is selected on the screen for creation of an input profile for color matching as illustrated in FIG. 5B. In a case where the CPU 0201 determines in step S0621 that the cancel button 0511 is selected (YES in step S0621), the creation process of an input profile for color matching is suspended, and the series of processes ends. In a case where the CPU 0201 determines in step S0621 that the cancel button 0511 is not selected (NO in step S0621), the processing returns to step S0619.

As described above, to reproduce a color in a color chart, when an input profile for color matching is created by scanning the color chart, a paper white portion is identified from scanned data of the color chart. From among existing profiles, profiles having information regarding a sheet white point in which the difference from the paper white in the scanned data is small are extracted and determined as candidates for creation of the input profile for color matching. This configuration leads to the achievement of creating an input profile for color matching with which a decrease in the color matching accuracy of a highlighted portion due to the difference from paper white in a color chart is prevented.

In the first exemplary embodiment, all the profiles each having "output" as its type among profiles stored in the image forming apparatus 0102 are determined as targets of candidates for creation of an input profile for color matching. A profile having "output" as its type, however, is also influenced by the state of the color quality of the image forming apparatus 0102 itself of when the profile has been created. Thus, if an input profile for color matching is created using a profile having date and time of when the profile has been created is old or a profile having date and time of when the profile has been used last is old, the accuracy of the input profile for color matching may decrease. In a second exemplary embodiment, a description will be given of a configuration in which not all the profiles, but profiles each selected by factoring in date and time of when the profile has been created and date and time of when the profile has been used last are determined as targets of candidates for creation of an input profile for color matching. The basic configuration of the present exemplary embodiment is similar to that of the first exemplary embodiment, and therefore, only the differences between the first and present exemplary embodiments are illustrated. With reference to FIGS. 7A, 7B, 8A, and 8B, a description is given of a procedure of the creation process of an input profile for color matching according to the present exemplary embodiment.

FIGS. 7A and 7B illustrate examples of a profile and setting values stored in the client computer 0101 and the image forming apparatus 0102 and to be used to create an input profile for color matching.

These pieces of information are stored in the storage unit 0203 of the client computer 0101 and the storage unit 0209 of the image forming apparatus 0102. Items 0405 to 0409 are similar to those in FIGS. 4A to 4C in the first exemplary embodiment, and the redundant descriptions are omitted.

FIG. 7A illustrates an example of profiles stored in the storage unit 0209 of the image forming apparatus 0102 according to the present exemplary embodiment. Profile creation date and time 0701 indicates the date and time of when the profile has been created. Last use date and time 0702 indicates the date and time of when the profile has been used last in the image forming apparatus 0102.

FIG. 7B illustrates a setting value that is used to determine whether the profile is a profile to be a target for creation of an input profile for color matching. This setting value is stored in the storage unit 0203 of the client computer 0101. Profile validity period 0703 indicates the validity period of the profile. In determination of whether the profile is used as a candidate in creation of an input profile for color matching, a profile having the validity period less than or equal to the setting value is determined as a target. Comparison targets of the profile validity period 0703 are the profile creation date and time 0701 and the last use date and time 0702, and in a case where either one of the profile creation date and time 0701 and the last use date and time 0702 is within the profile validity period 0703, the profile is determined as a candidate in creation of an input profile for color matching.

Figure 8A:
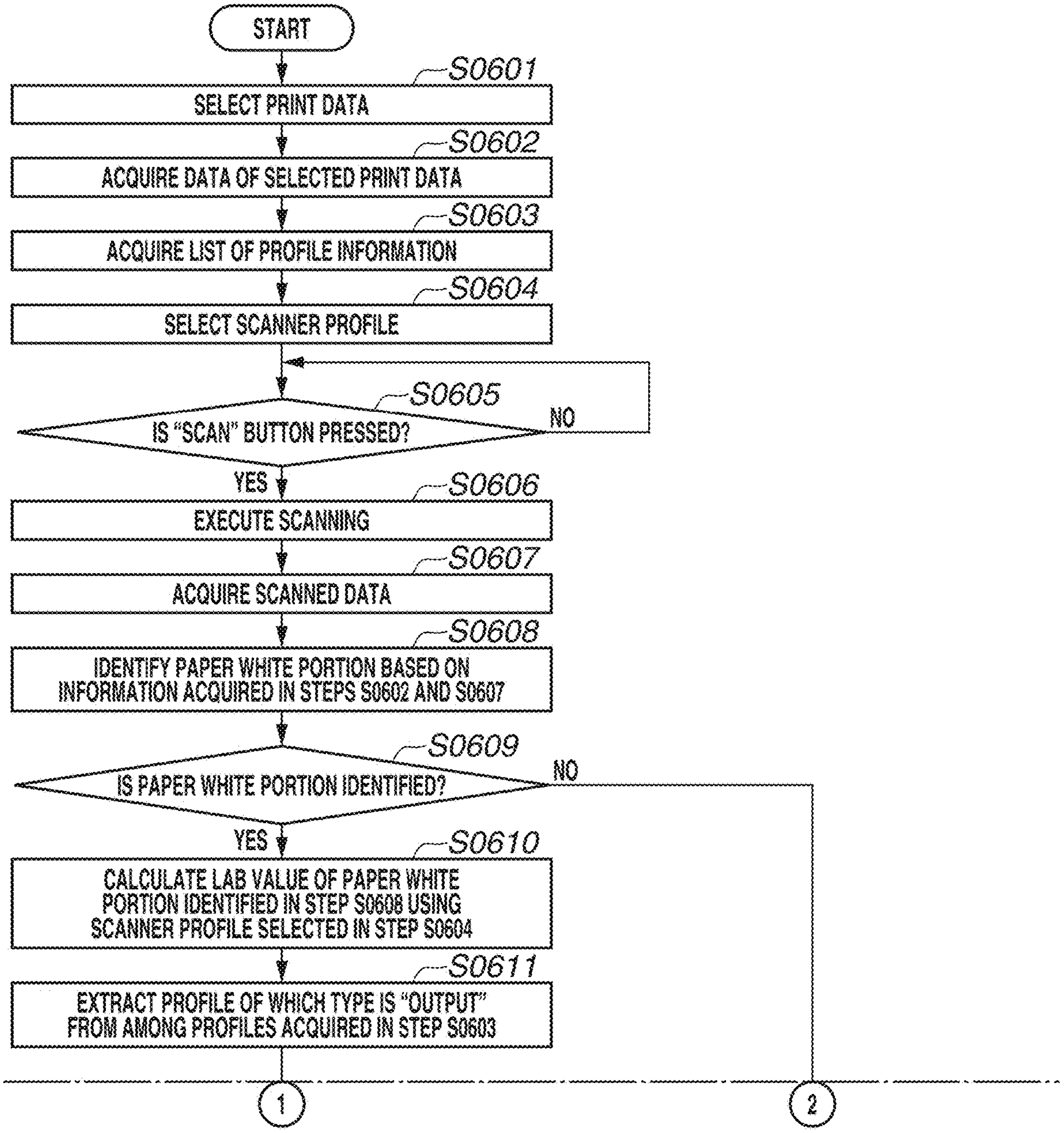
FIGS. 8A and 8B are flowcharts illustrating a procedure of a process of creating an input profile for color matching according to the second exemplary embodiment.
Figure 8B:
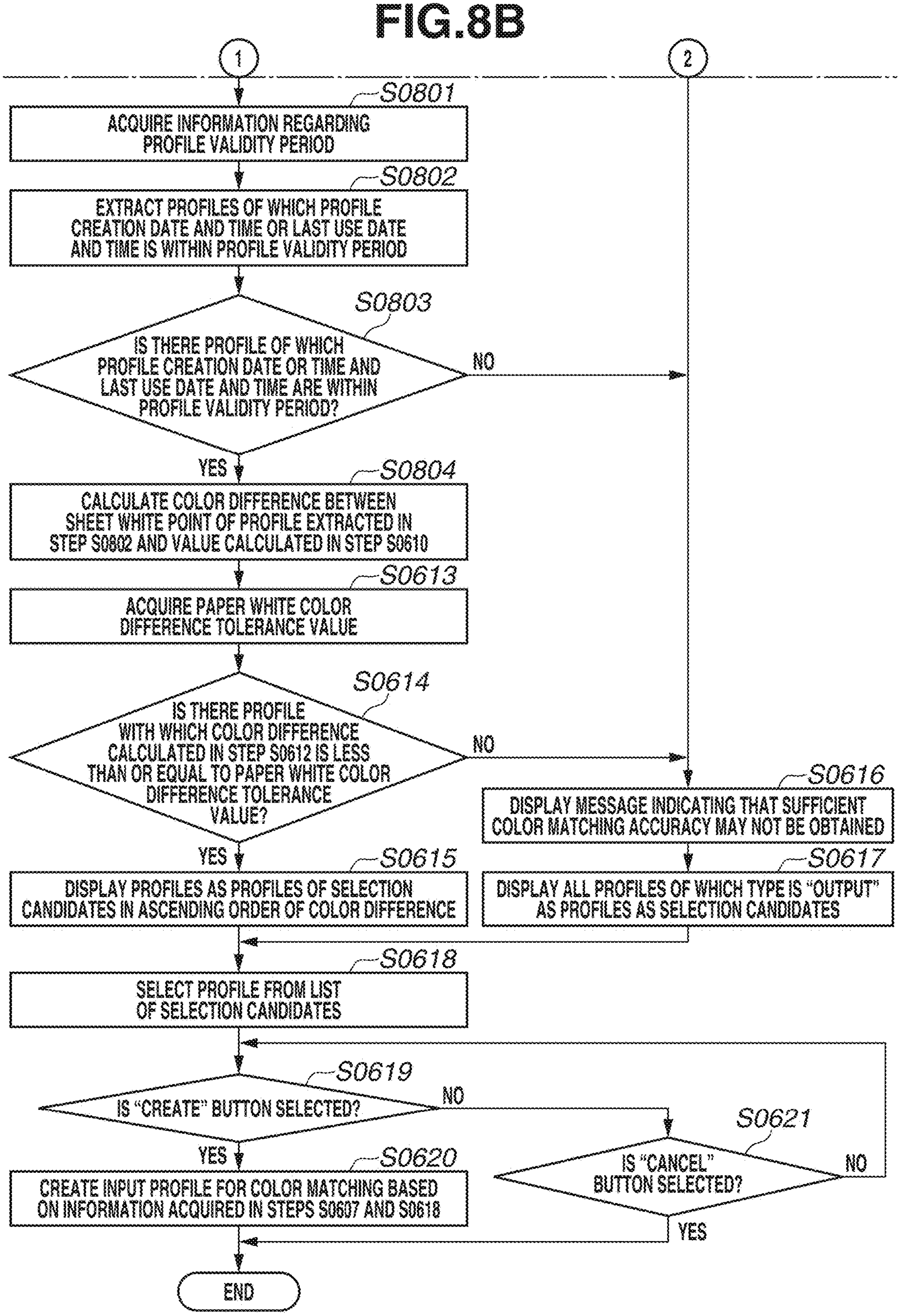

FIGS. 8A and 8B are a flowchart illustrating a procedure of the creation process of an input profile for color matching according to the present exemplary embodiment. The following processing is executed by the CPU 0201 of the client computer 0101 and the CPU 0207 of the image forming apparatus 0102. The processes of steps S0601 to S0621 are similar to the processes in FIGS. 6A and 6B in the first exemplary embodiment, and the redundant descriptions are omitted.

In step S0801, the CPU 0201 of the client computer 0101 acquires the setting value of the profile validity period 0703 from the storage unit 0203. In step S0802, the CPU 0201 of the client computer 0101 extracts profiles having the profile creation date and time 0701 or the last use date and time 0702 within the profile validity period 0703 acquired in step S0801 from among the profiles acquired in step S0611. In step S0803, the CPU 0201 of the client computer 0101 determines whether there is a profile having the profile creation date and time 0701 or the last use date and time 0702 within the profile validity period 0703 acquired in step S0801 as a result of the extraction in step S0802. In a case where the CPU 0201 determines in step S0803 that there is a profile having the profile creation date and time 0701 or the last use date and time 0702 within the profile validity period 0703 (YES in step S0803), the processing proceeds to step S0804. In a case where the CPU 0201 determines in step S0803 that there is not a profile having the profile creation date and time 0701 or the last use date and time 0702 within the profile validity period 0703 (NO in step S0803), the processing proceeds to step S0616. From this point onward, processes similar to those in FIG. 6B in the first exemplary embodiment are performed.

In step S0804, the CPU 0201 of the client computer 0101 obtains the color difference between the value of the sheet white point 0409 of each of the profiles extracted in step S0802 and the Lab value of the paper white in the scanned data calculated in step S0610.

From this point onward, as described above, processes similar to those in FIGS. 6A and 6B in the first exemplary embodiment are performed, and the redundant descriptions are omitted.

The above-described configuration leads to the achievement of excluding a profile having date and time of when the profile has been created is old and a profile having date and time of when the profile has been used last is old among profiles stored in the image forming apparatus 0102 from targets for creation of an input profile for color matching. This prevents a decrease in the accuracy of an input profile for color matching due to a cause other than paper white.

In the first exemplary embodiment, in creation of an input profile for color matching, a profile with which the color difference between paper white in a color chart and the sheet white point 0409 of the profile is less than or equal to the paper white color difference tolerance value in the information table 0410 is determined as a profile of a candidate for creation of an input profile for color matching. In this process, in a case where there is no profile with which the color difference is less than or equal to the paper white color difference tolerance value in the information table 0410, a profile may be newly created and used to create an input profile for color matching. In newly creation of a profile, a sheet to be used to print a chart for creation of the profile to create the profile may be presented to the user with reference to the paper white in the color chart. In a third exemplary embodiment, such a configuration will be described. The basic configuration of the present exemplary embodiment is similar to that of the first exemplary embodiment, and therefore, only the differences between the first and resent exemplary embodiments are described. With reference to FIGS. 9A, 9B, 10A, and 10B, a description is given of a procedure of the creation process of an input profile for color matching according to the present exemplary embodiment.

Figure 9A:
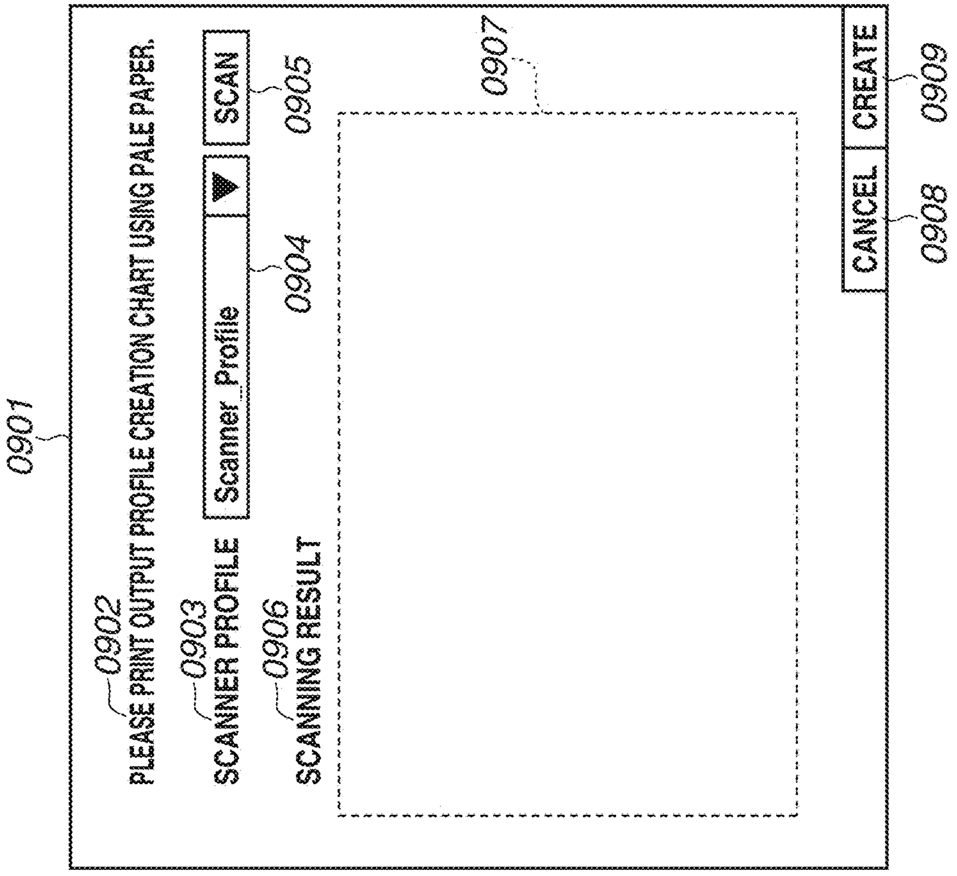
FIGS. 9A and 9B are diagrams illustrating examples of an execution screen that is displayed when an output profile is newly created according to a third exemplary embodiment.
Figure 9B:
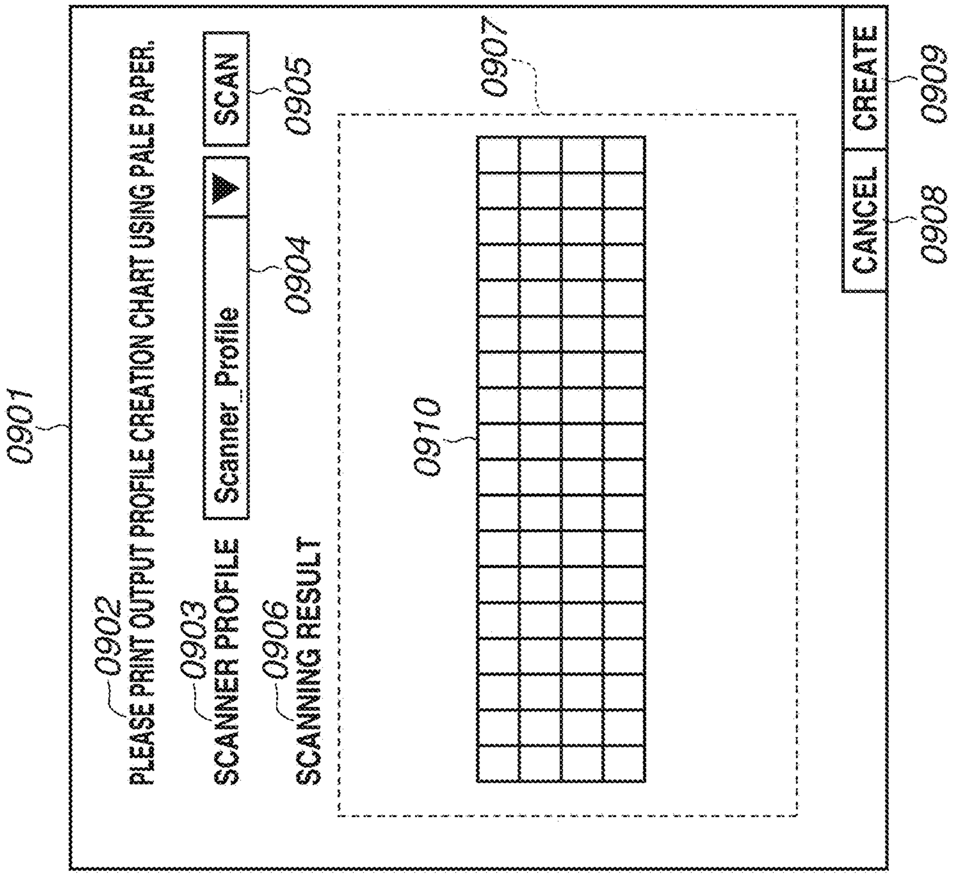

FIGS. 9A and 9B illustrate screens displayed when an output profile is newly created in a case where a profile with which the color difference from paper white in a color chart is less than or equal to the paper white color difference tolerance value is not found in creation of an input profile for color matching.

FIG. 9A illustrates the screen displayed before a chart for creation of a profile is scanned when an output profile is newly created. This screen is displayed on the display unit 0205 of the client computer 0101 by the CPU 0201 of the client computer 0101. A screen 0901 indicates the entire appearance of the execution screen displayed when an output profile is created. An item 0902 indicates a sheet that may be used to print a chart for creation of an output profile. The sheet that may be used to print a chart for creating an output profile is displayed based on the Lab value of paper white in a color chart. An item 0903 is used to set a scanner profile. A button 0904 is used to select a scanner profile, and a list of scanner profiles as selection candidates is displayed in a drop-down list. Profiles displayed as the selection candidates are profiles having "scanner" as its type among profiles stored in the storage unit 0209 of the image forming apparatus 0102. A scan button 0905 is used to execute scanning. In response to the scan button 0905 being pressed, the client computer 0101 instructs the image forming apparatus 0102 to execute scanning using the scanner 0211. An item 0906 indicates the scanning result. An area 0907 displays a scanned image. In response to a cancel button 0908 being pressed, the currently displayed screen is closed without creating an output profile. In response to a create button 0909 being pressed, an output profile is created, and an input profile for color matching is also created using the output profile.

FIG. 9B illustrates the screen displayed after a chart for creation of a profile is scanned when an output profile is newly created. This screen is displayed on the display unit 0205 of the client computer 0101 by the CPU 0201 of the client computer 0101. Data 0910 is scanned data obtained using, in response to the scan button 0905 being pressed, the scanner 0211 of the image forming apparatus 0102. The CPU 0201 of the client computer 0101 acquires the scanned data from the storage unit 0209 of the image forming apparatus 0102 and displays the acquired scanned data on the display unit 0205.

Figure 10A:
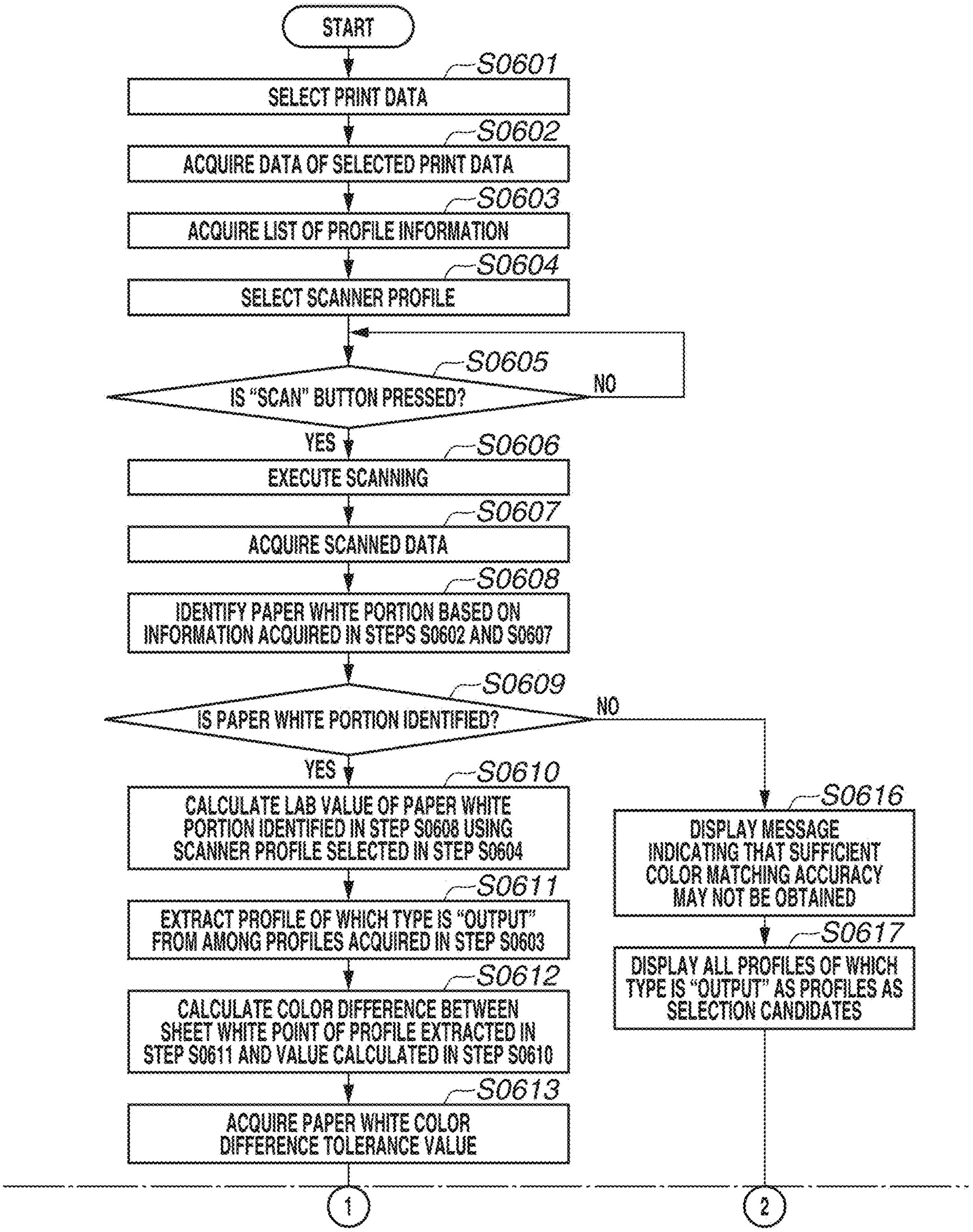
FIGS. 10A and 10B are flowcharts illustrating a procedure of a process of creating an input profile for color matching according to the third exemplary embodiment.
Figure 10B:
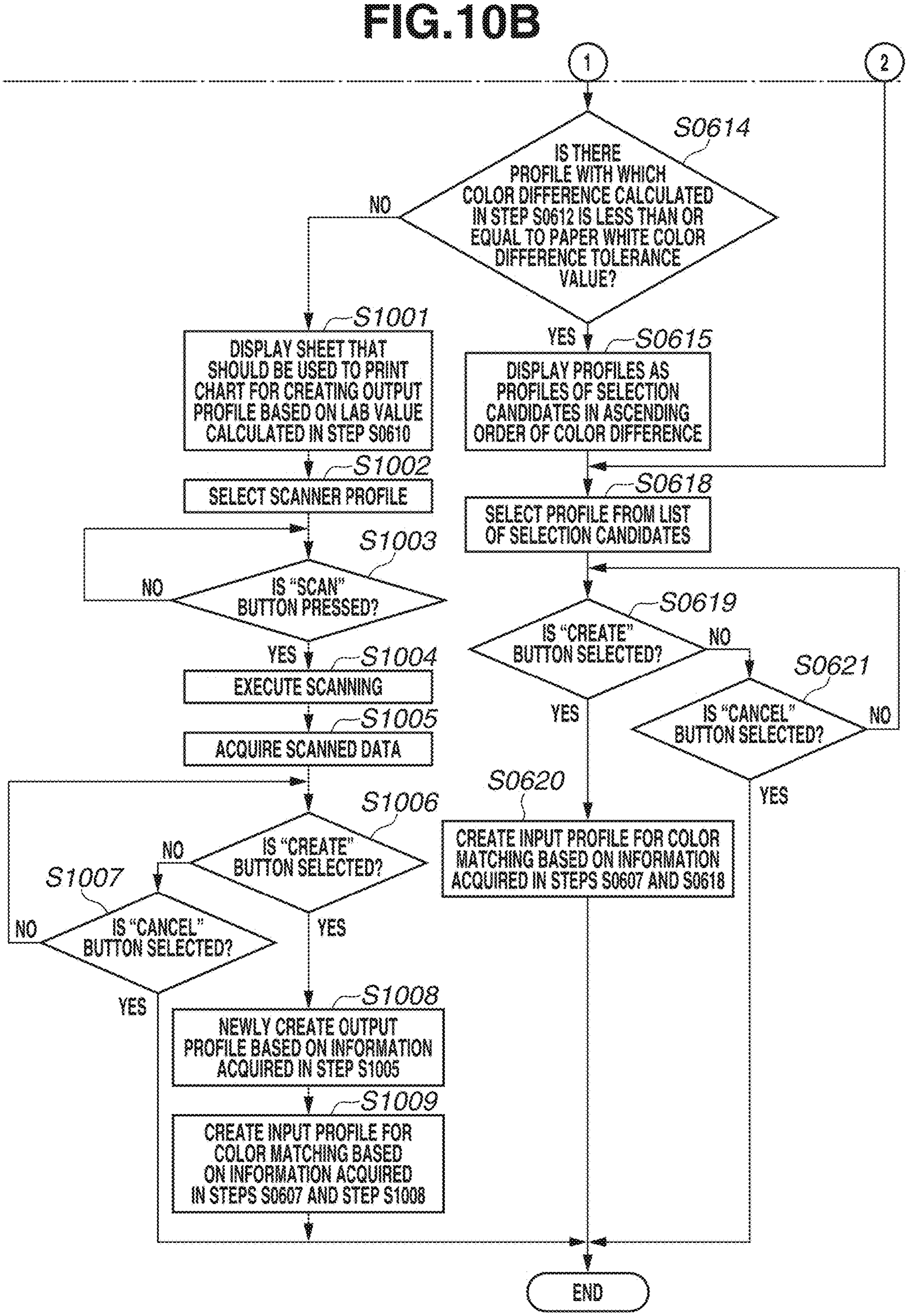

FIGS. 10A and 10B are a flowchart illustrating a procedure of the creation process of an input profile for color matching according to the present exemplary embodiment. The following processing is executed by the CPU 0201 of the client computer 0101 and the CPU 0207 of the image forming apparatus 0102.

The processes of steps S0601 to S0621 are similar to the processes in FIGS. 6A and 6B in the first exemplary embodiment, and the redundant descriptions are omitted.

In step S1001, based on the Lab value of the paper white in the scanned data calculated in step S0610, the CPU 0201 of the client computer 0101 displays on the display unit 0205 a sheet that may be used when a chart for creation of an output profile is printed. In step S1002, the user selects a profile having "scanner" as its type from among the profiles acquired in step S0603 on the screen for creation of an output profile as illustrated in FIG. 9B, and the CPU 0201 of the client computer 0101 stores the selected profile in the RAM 0202. In step S1003, the CPU 0201 of the client computer 0101 determines whether the scan button 0905 is pressed. In a case where the CPU 0201 determines in step S1003 that the scan button 0905 is pressed (YES in step S1003), the processing proceeds to step S1004. In a case where the CPU 0201 determines in step S1003 that the scan button 0905 is pressed (NO in step S1003), the processing returns to step S1003. In step S1003, the CPU 0201 of the client computer 0101 waits to perform the processing until the CPU 0201 determines that the scan button 0905 is pressed.

In step S1004, the CPU 0201 of the client computer 0101 instructs the image forming apparatus 0102 to execute scanning via the network 0110.

In response to receipt of the instruction to execute scanning from the client computer 0101 via the network 0110, the CPU 0207 of the image forming apparatus 0102 uses the scanner 0211 to scan a print product and stores scanned data on the print product in the storage unit 0209. In step S1005, the CPU 0201 of the client computer 0101 instructs the image forming apparatus 0102 to acquire the scanned data via the network 0110. In response to the instruction to acquire the scanned data from the client computer 0101 via the network 0110, the CPU 0207 of the image forming apparatus 0102 transmits the scanned data stored in the storage unit 0209 to the client computer 0101. The CPU 0201 of the client computer 0101 temporarily stores the acquired scanned data in the RAM 0202.

In step S1006, the CPU 0201 of the client computer 0101 determines whether the create button 0909 is selected on the screen for creation of an output profile as illustrated in FIG. 9B. In a case where the CPU 0201 determines in step S1006 that the create button 0909 is selected (YES in step S1006), the processing proceeds to step S1008. In a case where the CPU 0201 determines in step S1006 that the create button 0909 is not selected (NO in step S1006), the processing proceeds to step S1007.

In step S1007, the CPU 0201 of the client computer 0101 determines whether the cancel button 0908 is selected on the screen for creation of an output profile as illustrated in FIG. 9B. In a case where the CPU 0201 determines in step S1007 that the cancel button 0908 is selected (YES in step S1007), the processes of creating an output profile and creating an input profile for color matching are suspended, and the series of processes ends. In a case where the CPU 0201 determines in step S1007 that the cancel button 0908 is not selected (NO in step S1007), the processing returns to step S1006.

In step S1008, based on the information regarding the scanned data acquired in step S1005, the CPU 0201 of the client computer 0101 creates an output profile. The CPU 0201 of the client computer 0101 transmits the created output profile to the image forming apparatus 0102 via the network 0110. In response to receipt of the created output profile from the client computer 0101 via the network 0110, the CPU 0207 of the image forming apparatus 0102 stores the created output profile in the storage unit 0209.

In step S1009, based on the information regarding the scanned data acquired in step S0607 and the output profile created in step S1008, the CPU 0201 of the client computer 0101 creates an input profile for color matching and stores the created input profile for color matching in the storage unit 0203. The CPU 0201 of the client computer 0101 transmits the created input profile for color matching to the image forming apparatus 0102 via the network 0110. In response to receipt of the created input profile for color matching from the client computer 0101 via the network 0110, the CPU 0207 of the image forming apparatus 0102 stores the created input profile in the storage unit 0209.

With the above-described configuration, in creation of an input profile for color matching, in a case where there is no profile with which the color difference is less than or equal to the paper white color difference tolerance value in the information table 0410, a profile is newly created. The created profile is used to create an input profile for color matching, whereby, even in a case where there is a risk that the color matching accuracy decreases with a profile already held in the image forming apparatus 0102, the decrease in the color matching accuracy is prevented.

In the third exemplary embodiment, a sheet that may be used when a chart for creating an output profile is printed is presented based on the value of paper white in data obtained by scanning a color chart. There can be, however, a possibility that a chart for creating an output profile is printed using a sheet having paper white different from the intended sheet by an erroneous operation of the user. Then, an output profile different from the intention is created.

Figure 11A:
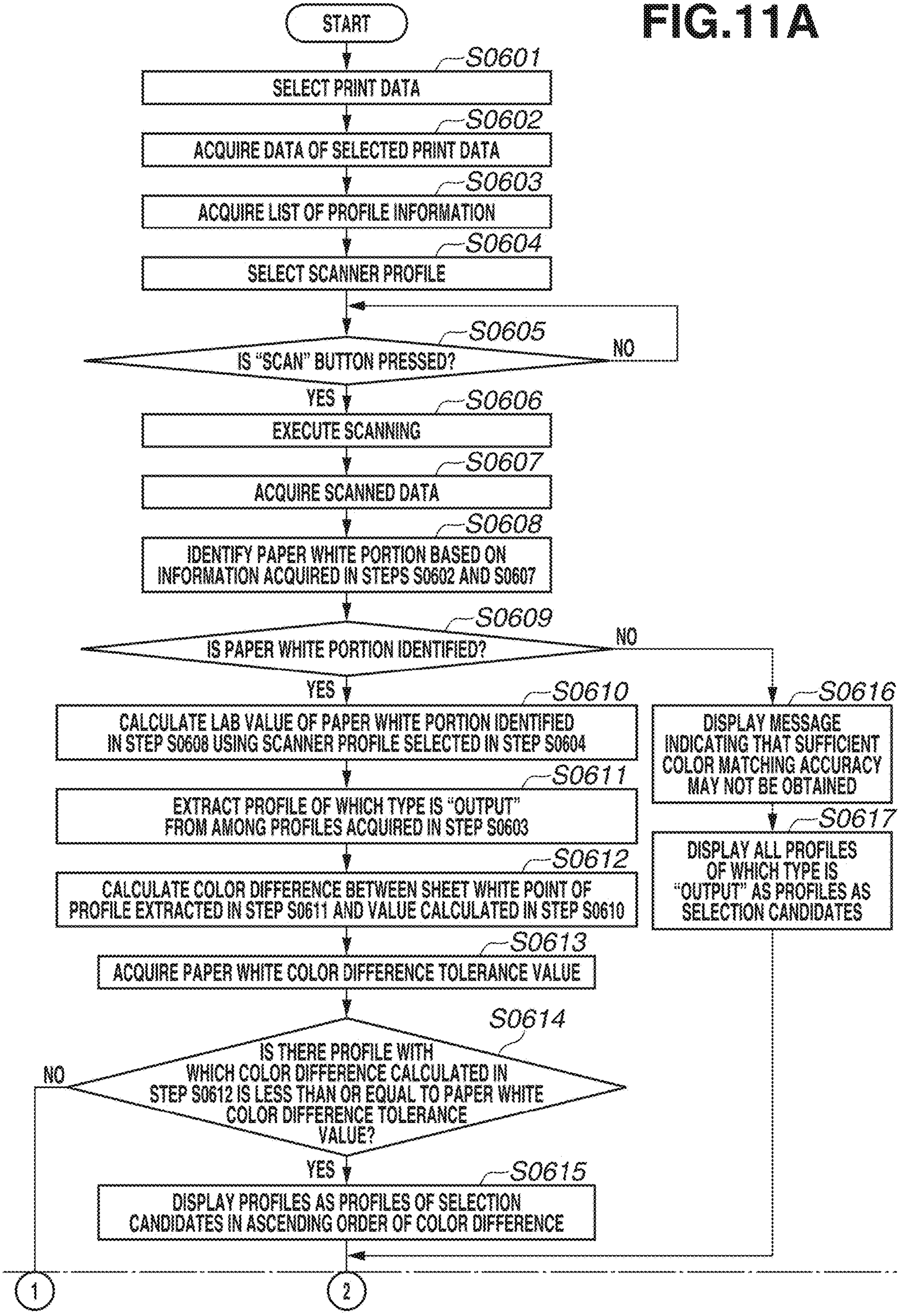
FIGS. 11A and 11B are flowcharts illustrating a procedure of a process of creating an input profile for color matching according to a fourth exemplary embodiment.
Figure 11B:
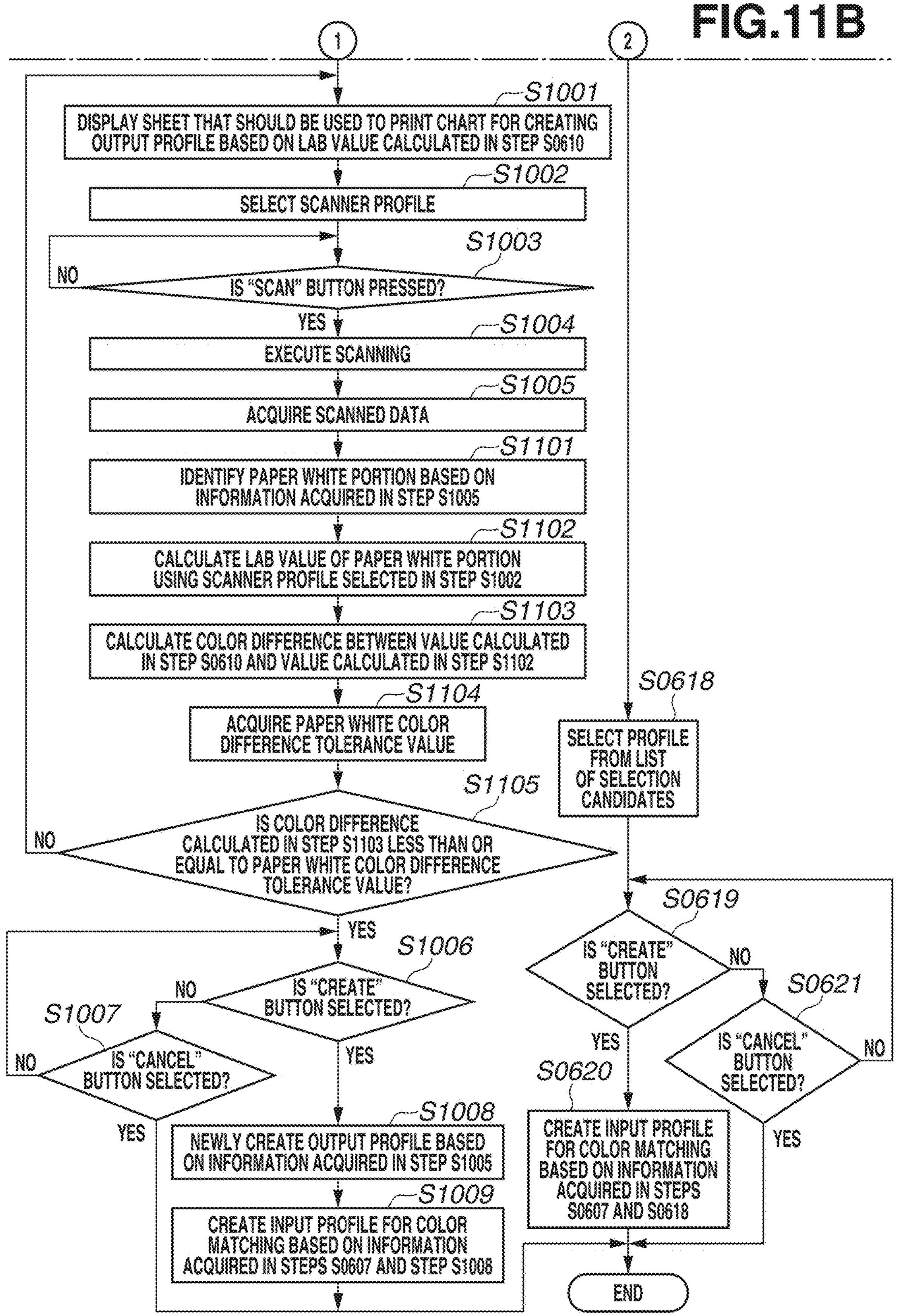

To prevent the above-described issue, in a fourth exemplary embodiment, a printed chart for creation of an output profile is scanned, and an output profile is created using data on the scanned printed chart. Meanwhile, in the scanning of the printed chart, a paper white portion is identified, and the difference between the value of the paper white portion and the value of paper white obtained in the scanning of a color chart is obtained. Then, determination of whether an appropriate output profile is to be created is performed. The basic configuration of the present exemplary embodiment is similar to that of the first exemplary embodiment, and therefore, only the differences between the first and present exemplary embodiments are illustrated. With reference to FIGS. 11A and 11B, a description is given of a procedure of the creation process of an input profile for color matching according to the present exemplary embodiment.

FIGS. 11A and 11B are a flowchart illustrating the procedure of the creation process of an input profile for color matching according to the present exemplary embodiment. The following processing is executed by the CPU 0201 of the client computer 0101 and the CPU 0207 of the image forming apparatus 0102. The processes of steps S0601 to S0621 are similar to the processes in FIGS. 6A and 6B in the first exemplary embodiment, the processes of steps S1001 to S1009 are similar to the processes in FIG. 10B in the third exemplary embodiment, and the redundant descriptions are omitted.

In step S1101, the CPU 0201 of the client computer 0101 identifies a portion corresponding to paper white in the scanned data acquired in step S1005. Alignment is performed to identify in which portion in the scanned data the data 0404 on the print data is present, and based on paper white (data in all the CMYK values are 0) in the print data or a margin portion of the document, a portion corresponding to paper white in the scanned data is identified. In step S1102, using the scanner profile selected in step S1002, the CPU 0201 of the client computer 0101 obtains the Lab value, which is the value in the common color space, of the paper white portion in the scanned data identified in step S1101. Then, in step S1103, the CPU 0201 of the client computer 0101 obtains the color difference between the Lab value of the paper white in the scanned data calculated in step S0610 and the Lab value of the paper white in the scanned data calculated in step S1102. In step S1104, the CPU 0201 of the client computer 0101 acquires the paper white color difference tolerance value in the information table 0410 stored in the storage unit 0203. In step S1105, the CPU 0201 of the client computer 0101 determines whether the color difference calculated in step S1103 is less than or equal to the paper white color difference tolerance value in the information table 0410 acquired in step S1104. In a case where the CPU 0201 determines in step S1105 that the color difference is less than or equal to the paper white color difference tolerance value in the information table 0410 (YES in step S1105), the processing proceeds to step S1006. The processes of step S1006 and subsequent steps are similar to the processes in FIG. 10B in the third exemplary embodiment, and the redundant descriptions are omitted. In a case where the CPU 0201 determines in step S1105 that the color difference is not less than or equal to the paper white color difference tolerance value in the information table 0410 (NO in step S1105), the processing returns to step S1001. In step S1001, information regarding a sheet that may be used when a chart for creation of an output profile is printed is displayed again. The processes of step S1002 and subsequent steps are similar to the processes in FIG. 10B in the third exemplary embodiment, and the redundant descriptions are omitted. In a case where the CPU 0201 determines in step S1105 that the color difference is not less than or equal to the paper white color difference tolerance value in the information table 0410, a notification screen indicating the determination result to the user may be displayed.

In the above-described way, a printed chart for creation of a profile is scanned, and an output profile is created using data on the scanned printed chart. Meanwhile, in the scanning of the printed chart, a paper white portion is identified, and the difference between the value of the paper white portion and a value of paper white obtained in scanning of the color chart is obtained. This configuration leads to the achievement of reducing creation of an output profile using a sheet different from an intended value due to an erroneous operation of the user.

In the first to fourth exemplary embodiments, in creation of an input profile for color matching, a profile with which the color difference from the paper white in the color chart is less than or equal to the tolerance value is used, whereby a decrease in the color matching accuracy of a highlighted portion is prevented. If, however, a sheet different from the color chart is used as a sheet for printing using the created input profile for color matching due to an erroneous operation of the user, intended color matching accuracy is not obtained.

Figure 13:
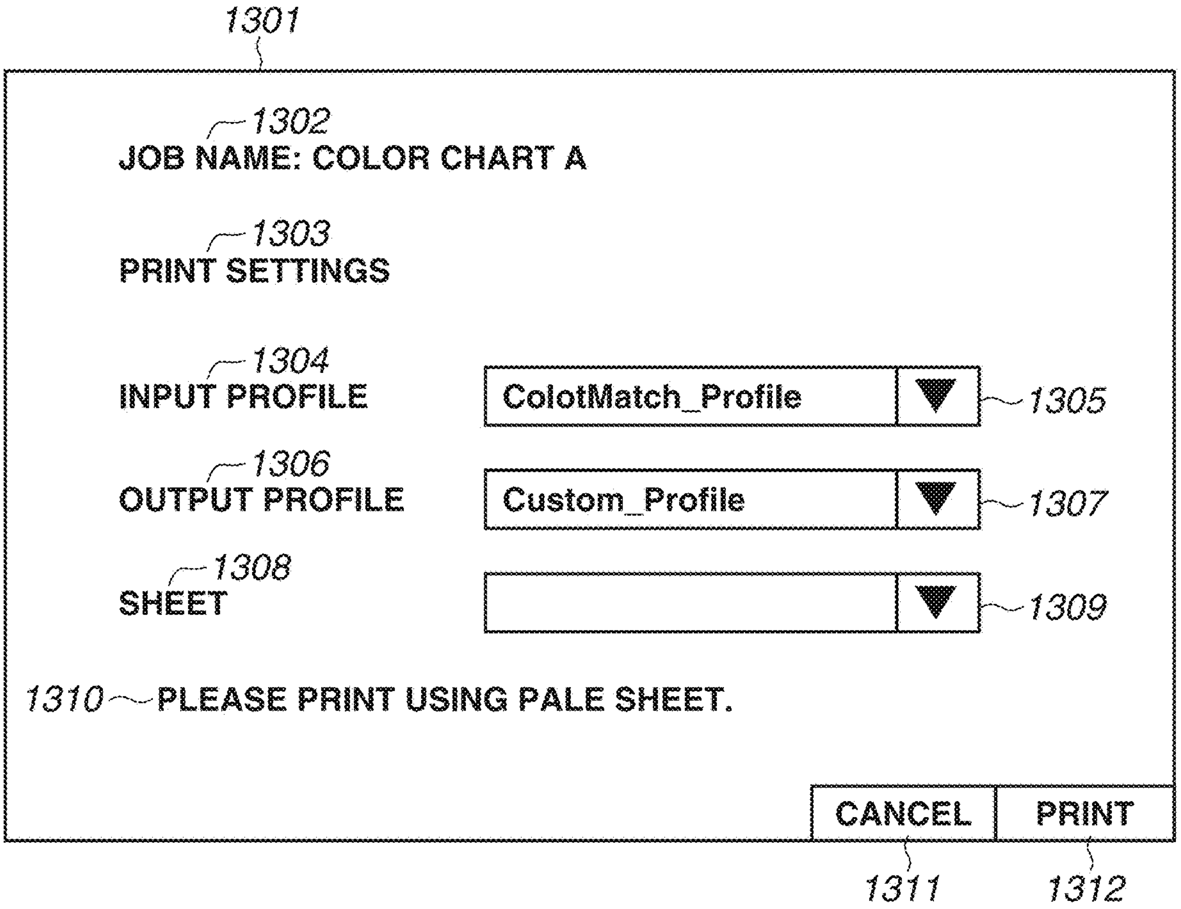
FIG. 13 is a diagram illustrating an example of a print setting screen that is displayed when printing using an input profile for color matching is performed according to the fifth exemplary embodiment.
Figure 14:
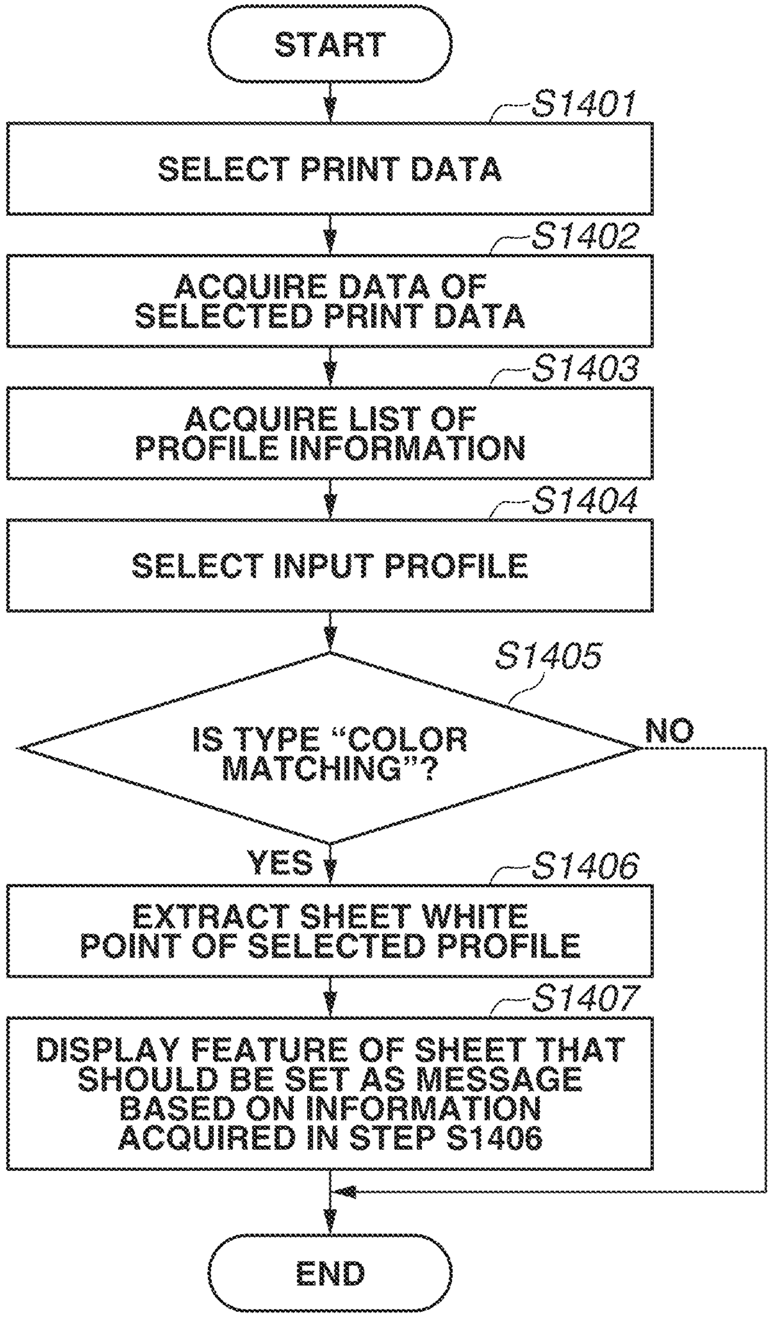
FIG. 14 is a flowchart illustrating a procedure of a print settings process that is performed when printing using an input profile for color matching is performed according to the fifth exemplary embodiment.

Accordingly, in a fifth exemplary embodiment, in printing using an input profile for color matching, a sheet that may be set is displayed in a sheet setting in the print settings, whereby the situation where intended color matching accuracy is not obtained is prevented. The basic configuration of the fifth exemplary embodiment is similar to that of the first exemplary embodiment, and therefore, only the differences between the first and fifth exemplary embodiments are illustrated. With reference to FIGS. 12, 13, and 14, a description is given of a procedure of the setting process of print settings when printing using an input profile for color matching is performed according to the present exemplary embodiment.

FIG. 12 illustrates an example of a profile stored in the client computer 0101 and the image forming apparatus 0102. These pieces of information are stored in the storage unit 0209 of the image forming apparatus 0102.

An information table 1201 indicates a type of information stored as the profile. Profile ID 1202 is ID information for identification of the saved profile. Type 1203 indicates a type of the profile. In a case where the type is "input", the profile is a profile indicating values that are to be obtained by converting input signal values, such as cyan (C), magenta (M), yellow (Y), and black (K) values, into the Lab color space, which is the common color space. In a case where the type is "output", the profile is a profile indicating values that are to be obtained by converting the Lab color space into CMYK values. In a case where the type is "scanner", the profile is a profile indicating values that are to be obtained by converting signal values of an image acquired using the scanner 0211 into the Lab color space, which is the common color space. In a case where the type is "color matching", the profile is a profile for use in color matching printing. Profile name 1204 indicates a name of the profile. Sheet white point 1205 indicates sheet white point information regarding the profile. The profile is defined in the ICC format.

In the definition of the ICC format, a definition of paper white represented by a value in the Lab color space or the XYZ color space, which is termed as a sheet white point, is essential in the profile. The sheet white point 1205 indicates a content of the sheet white point.

FIG. 13 illustrates a screen for print settings displayed when printing using an input profile for color matching is performed.

This screen is displayed on the display unit 0205 of the client computer 0101 by the CPU 0201 of the client computer 0101.

A screen 1301 indicates the entire appearance of the print settings screen. An item 1302 indicates a name of a print job on which the user currently performs print settings. An item 1303 indicates that items displayed below the item 1303 are related to the print settings. An item 1304 indicates a setting item for an input profile in the print settings. A button 1305 is used to select an input profile, and a list of input profiles as selection candidates or input profiles for color matching is displayed in a drop-down list. An item 1306 indicates a setting item for an output profile in the print settings. A button 1307 is used to select an output profile, and a list of output profiles as selection candidates is displayed in a drop-down list.

An item 1308 indicates a setting item for a sheet in the print settings. A button 1309 is used to select a sheet, and a list of sheets as selection candidates is displayed in a drop-down list.

An item 1310 indicates a sheet that may be set in the item 1308 for the sheet setting. The item 1310 is displayed only in a case where an input profile for color matching is set in the item 1304 for an input profile. In response to a cancel button 1311 being pressed, the currently displayed screen is closed without setting the print settings. In response to a print" button 1312 being pressed, the print job starts with the currently set print settings.

With reference to FIG. 14, a description is given of a flowchart illustrating a procedure of the setting process of print settings when printing using an input profile for color matching is performed according to the present exemplary embodiment. The following processing is executed by the CPU 0201 of the client computer 0101 and the CPU 0207 of the image forming apparatus 0102.

In step S1401, the CPU 0201 of the client computer 0101 stores print data selected by the user on the print settings screen as illustrated in FIG. 13 in the RAM 0202. In step S1402, the CPU 0201 of the client computer 0101 acquires a content of the print data selected in step S1401 from the storage unit 0203. In step S1403, the CPU 0201 of the client computer 0101 acquires profile information regarding profiles present in the storage unit 0209 of the image forming apparatus 0102 via the network 0110. In step S1404, the user selects a profile having "input" or "color matching" as its type from among the profiles acquired in step S1403 on the printing settings screen as illustrated in FIG. 13, and the CPU 0201 of the client computer 0101 stores the selected profile in the RAM 0202. In step S1405, the CPU 0201 of the client computer 0101 determines whether the type of the profile selected in step S1404 is "color matching". In a case where the CPU 0201 determines in step S1405 that the type of the profile is "color matching" (YES in step S1405), the processing proceeds to step S1406. In a case where the CPU 0201 determines in step S1405 that the type of the profile is not "color matching" (NO in step S1405), the series of processes ends.

In step S1406, the CPU 0201 of the client computer 0101 acquires the sheet white point 1205 of the profile selected in step S1404. In step S1407, based on the value of the sheet white point 1205 acquired in step S1406, the CPU 0201 of the client computer 0101 displays the feature of a sheet that may be set in the sheet setting in the print settings as a message on the display unit 0205. Examples of the feature of the sheet that may be set include pale paper, although this is merely an example.

With the above-described configuration, in print settings using an input profile for color matching, the feature of a sheet that may be set is displayed based on sheet white point information regarding the input profile for color matching. This prevents the situation where intended color matching accuracy is not obtained due to an erroneous operation of the user.

Other Exemplary Embodiments

A configuration may be obtained by combining one or more of the first to fifth exemplary embodiments.

A storage medium in which program codes of software for realizing the above-described functions are recorded may be provided to a system or an apparatus, and a computer (CPU or MPU) of the system or the apparatus may read and execute the program codes stored in the storage medium. In this case, the program code itself read from the storage medium realizes the functions of the above-described exemplary embodiments, and the storage medium storing the program code constitutes the above-described apparatus.

Examples of the storage medium that is used to supply the program code include a flexible disk, a hard disk, an optical disk, a magneto-optical disk, a CD-ROM, a CD-R, a magnetic tape, a nonvolatile memory card, a ROM, a DVD.

Furthermore, the functions described above may be implemented not only by executing the program code read by the computer but also by causing an operating system (OS) running on the computer to perform part or all of the actual processing based on the instructions of the program code.

Furthermore, the program code read out from the storage medium is written in a memory disposed in a function expansion board inserted into the computer or a function expansion unit connected to the computer.

Based on the instructions of the program code, a CPU included in the function expansion board or the function expansion unit may perform a part or all of the actual processing to realize the above-described functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-129010, filed Aug. 8, 2023, which is hereby incorporated by reference herein in its entirety.

What is claimed is:

1. A method for an information processing apparatus that communicates with an image forming apparatus, the method comprising:

acquiring, as first acquiring, image data generated by the image forming apparatus scanning a document;

identifying a paper white portion from the image data acquired by the first acquiring;

acquiring, as second acquiring, one or more output profiles;

displaying, as first displaying, the one or more output profiles acquired by the second acquiring, based on information regarding the paper white portion identified by the identifying; and creating, as first creating, an input profile based on an output profile selected from among the one or more output profiles displayed by the first displaying and the image data acquired by the first acquiring.

2. The method according to claim 1, further comprising instructing the image forming apparatus to execute scanning using a selected profile for scanning.

3. The method according to claim 1, wherein based on a Lab value of the paper white portion identified by the identifying and a value of a paper white portion of the one or more output profiles acquired by the second acquiring, the one or more output profiles are displayed.

4. The method according to claim 1, wherein based on a Lab value of the paper white portion identified by the identifying, a Lab value of a paper white portion of the one or more output profiles acquired by the second acquiring, and a predetermined tolerance value, the one or more output profiles are displayed.

5. The method according to claim 1, wherein from among the one or more output profiles acquired by the second acquiring, an output profile with which a color difference between the paper white portion identified by the identifying and a paper white portion of the output profile is less than or equal to a predetermined value is displayed.

6. The method according to claim 1, further comprising displaying, as second displaying, in a case where based on a color difference between the paper white portion identified by the identifying and a paper white portion of each of the one or more output profiles acquired by the second acquiring, there is no output profile with which the color difference is less than or equal to a predetermined value, a message indicating that there is no output profile with which the color difference is less than or equal to the predetermined value.

7. The method according to claim 1, further comprising creating, as second creating, a new output profile, in a case where based on a color difference between the paper white portion identified by the identifying and a paper white portion of each of the one or more output profiles acquired by the second acquiring, there is no output profile with which the color difference is less than or equal to a predetermined value.

8. The method according to claim 7, further comprising notifying a user of a sheet that may be used, in a case where an output profile is created by the second creating.

9. The method according to claim 1, wherein further based on a validity period of each of the one or more output profiles, the one or more profiles are displayed.

10. The method according to claim 1, wherein based on an output profile selected from among the one or more output profiles displayed by the displaying and the image data acquired by the first acquiring, an input profile for reproduction of a same tint as a tint of the document is created by the first creating.

11. The method according to claim 1, wherein the one or more output profiles are acquired from the image forming apparatus.

12. The method according to claim 1, each of the one or more output profiles is a profile indicating values that are to be obtained by converting a Lab color space into cyan (C), magenta (M), yellow (Y), and black (K) values, and the input profile is a profile indicating values that are to be obtained by converting CMYK values into the Lab color space that is a common color space.

13. An information processing apparatus that communicates with an image forming apparatus, the information processing apparatus comprising:

at least one processor and at least a memory coupled to the at least one processor and having instructions stored thereon, and when executed by the at least one processor, acting as:

a first acquiring unit configured to acquire image data generated by the image forming apparatus scanning a document;

an identifying unit configured to identify a paper white portion from the image data acquired by the first acquiring;

a second acquiring unit configured to acquire one or more output profiles;

a first displaying unit configured to display the one or more output profiles acquired by the second acquiring, based on information regarding the paper white portion identified by the identifying; and a first creating unit configured to create an input profile based on an output profile selected from among the one or more output profiles displayed by the first displaying and the image data acquired by the first acquiring.

14. A non-transitory computer-readable storage medium that stores one or more programs including instructions, which when executed by one or more processors of an information processing apparatus that communicates with an image forming apparatus, cause the information processing apparatus to perform a control method, the control method comprising:

acquiring, as first acquiring, image data generated by the image forming apparatus scanning a document;

identifying a paper white portion from the image data acquired by the first acquiring;

acquiring, as second acquiring, one or more output profiles;

displaying, as first displaying, the one or more output profiles acquired by the second acquiring, based on information regarding the paper white portion identified by the identifying; and creating, as first creating, an input profile based on an output profile selected from among the one or more output profiles displayed by the first displaying and the image data acquired by the first acquiring.

* * * * *